United States Patent
Cullen

(10) Patent No.: US 12,487,359 B2
(45) Date of Patent: Dec. 2, 2025

(54) PERCEIVING OBJECTS BASED ON SENSING SURFACES AND SENSING SURFACE MOTION

(71) Applicant: Summer Robotics, Inc., Campbell, CA (US)

(72) Inventor: Schuyler Alexander Cullen, Santa Clara, CA (US)

(73) Assignee: Summer Robotics, Inc., Campbell, CA (US)

( * ) Notice: Subject to any disclaimer, the term of this patent is extended or adjusted under 35 U.S.C. 154(b) by 602 days.

(21) Appl. No.: 17/551,054

(22) Filed: Dec. 14, 2021

(65) Prior Publication Data

US 2022/0187461 A1  Jun. 16, 2022

Related U.S. Application Data

(60) Provisional application No. 63/205,480, filed on Dec. 14, 2020.

(51) Int. Cl.
*G01S 17/58*  (2006.01)

(52) U.S. Cl.
CPC .................................. *G01S 17/58* (2013.01)

(58) Field of Classification Search
CPC .......... G01S 17/58; G01S 17/48; G01S 17/89; G06V 10/62; G06V 20/64
See application file for complete search history.

(56) References Cited

U.S. PATENT DOCUMENTS

| 6,748,112 B1 | 6/2004 | Nguyen et al. |
| 9,117,267 B2 | 8/2015 | Francis, Jr. et al. |
| 9,489,735 B1 | 11/2016 | Reitmayr |
| 10,213,645 B1 | 2/2019 | Wu et al. |

(Continued)

FOREIGN PATENT DOCUMENTS

| CN | 109458928 A | 3/2019 |
| CN | 112365585 A | 2/2021 |

(Continued)

OTHER PUBLICATIONS

WO-2020061214-A1_translated (Year: 2020).*

(Continued)

*Primary Examiner* — Natalie Huls
(74) *Attorney, Agent, or Firm* — John W. Branch; Branch Partners PLLC

(57) ABSTRACT

Embodiments are directed to perceiving surfaces and objects. Trajectories may be generated based on a continuous stream of sensor events such that each trajectory may be a parametric representation of a curve segment. The trajectories may be employed to determine the surfaces. The trajectories may be provided to a modeling engine to execute one or more actions based on the trajectories and the surfaces. In response to changes to the surfaces, the trajectories may be updated based on the continuous stream of sensor events and one or more additional actions may be executed based on the updated trajectories and the changed surfaces. Changes to the surfaces may include a position change, an orientation change, a motion change, a deformation of the one or more surfaces, or the like. Shapes that correspond to the surfaces may be determined based on characteristics of the surfaces or the trajectories.

32 Claims, 17 Drawing Sheets

(56) References Cited

U.S. PATENT DOCUMENTS

| | | |
|---|---|---|
| 11,704,835 B2 | 7/2023 | Cullen et al. |
| 11,785,200 B1 | 10/2023 | Smits et al. |
| 11,808,857 B2 | 11/2023 | Cullen et al. |
| 11,887,340 B2 | 1/2024 | Cullen et al. |
| 11,974,055 B1 | 4/2024 | Smits et al. |
| 12,111,180 B2 | 10/2024 | Paden |
| 12,148,185 B2 | 11/2024 | Cullen et al. |
| 12,262,127 B2 | 3/2025 | Smits et al. |
| 12,276,730 B2 | 4/2025 | Smits et al. |
| 2007/0090180 A1* | 4/2007 | Griffis .................... G06Q 10/06 235/375 |
| 2008/0012850 A1 | 1/2008 | Keating, III |
| 2008/0165360 A1 | 7/2008 | Johnston |
| 2008/0201101 A1 | 8/2008 | Hebert et al. |
| 2009/0087029 A1 | 4/2009 | Coleman et al. |
| 2009/0096994 A1 | 4/2009 | Smits |
| 2011/0122233 A1 | 5/2011 | Kasai et al. |
| 2011/0273442 A1 | 11/2011 | Drost et al. |
| 2014/0105506 A1 | 4/2014 | Drost et al. |
| 2014/0368614 A1 | 12/2014 | Imai et al. |
| 2015/0378023 A1 | 12/2015 | Royo Royo et al. |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0068861 A1 | 3/2017 | Miller et al. |
| 2017/0176575 A1 | 6/2017 | Smits |
| 2017/0195589 A1 | 7/2017 | Kovacovsky et al. |
| 2018/0180733 A1* | 6/2018 | Smits .................... G06T 7/521 |
| 2019/0128665 A1 | 5/2019 | Harendt |
| 2019/0213309 A1 | 7/2019 | Morestin et al. |
| 2019/0235081 A1 | 8/2019 | Smits |
| 2019/0258869 A1 | 8/2019 | Stelzer et al. |
| 2019/0279379 A1 | 9/2019 | Srinivasan et al. |
| 2020/0075658 A1 | 3/2020 | Kato et al. |
| 2020/0160012 A1 | 5/2020 | Nunnink et al. |
| 2020/0280664 A1 | 9/2020 | Lee et al. |
| 2021/0023714 A1 | 1/2021 | Zhang et al. |
| 2021/0141094 A1 | 5/2021 | Russ et al. |
| 2021/0261159 A1* | 8/2021 | Pazhayampallil .... B60W 10/18 |
| 2021/0278539 A1* | 9/2021 | Laddha ................. G01S 17/931 |
| 2021/0304574 A1 | 9/2021 | Ramanathan et al. |
| 2022/0156998 A1 | 5/2022 | Lee et al. |
| 2022/0222845 A1 | 7/2022 | Inada |
| 2022/0287676 A1 | 9/2022 | Steines et al. |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0169683 A1 | 6/2023 | Paden et al. |
| 2023/0230212 A1 | 7/2023 | García et al. |
| 2023/0274523 A1 | 8/2023 | Paden et al. |
| 2023/0316657 A1 | 10/2023 | Smits et al. |
| 2023/0360268 A1 | 11/2023 | Cullen et al. |
| 2024/0022819 A1 | 1/2024 | Smits et al. |
| 2024/0040274 A1 | 2/2024 | Smits et al. |
| 2024/0114235 A1 | 4/2024 | Gallagher et al. |
| 2024/0129645 A1 | 4/2024 | Smits et al. |
| 2024/0329248 A1 | 10/2024 | Smits et al. |
| 2025/0027765 A1 | 1/2025 | Paden |
| 2025/0056133 A1 | 2/2025 | Smits et al. |

FOREIGN PATENT DOCUMENTS

| | | |
|---|---|---|
| CN | 112750168 A | 5/2021 |
| CN | 113313710 A | 8/2021 |
| CN | 116829902 A | 9/2023 |
| EP | 4260006 A1 | 6/2022 |
| JP | H06-94428 A | 4/1994 |
| JP | 2009-243986 A | 10/2009 |
| JP | 2018-195240 A | 12/2018 |
| JP | 2020-52719 A | 4/2020 |
| JP | 2020-64011 A | 4/2020 |
| JP | 2020-106475 A | 7/2020 |
| JP | 2021-167776 A | 10/2021 |
| JP | 2024-501078 A | 1/2024 |
| KR | 10-2021-0075563 A | 6/2021 |
| WO | 2013/093459 A2 | 6/2013 |
| WO | 2018000037 A1 | 1/2018 |
| WO | 2018125850 A1 | 7/2018 |
| WO | 2019189381 A1 | 10/2019 |
| WO | WO-2020061214 A1 * | 3/2020 ............ B60W 30/09 |
| WO | 2020080237 A1 | 4/2020 |
| WO | 2021039022 A1 | 3/2021 |
| WO | 2021140886 A1 | 7/2021 |
| WO | 2022132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |
| WO | 2023/164064 A1 | 8/2023 |
| WO | 2023/177692 A1 | 9/2023 |
| WO | 2023/196225 A1 | 10/2023 |
| WO | 2024/025865 A1 | 2/2024 |

OTHER PUBLICATIONS

International Search Report and Written Opinion for International Patent Application No. PCT/US2021/063399 mailed Mar. 22, 2022, pp. 1-7.
Office Communication for U.S. Appl. No. 18/121,486 mailed Aug. 16, 2023, pp. 1-2.
International Preliminary Report on Patentability for International Patent Application No. PCT/US2021/063399 mailed Jun. 29, 2023, pp. 1-5.
International Search Report and Written Opinion for International Patent Application No. PCT/US2023/017271 mailed Jul. 11, 2023, pp. 1-7.
Office Communication for U.S. Appl. No. 18/121,486 mailed Aug. 3, 2023, pp. 1-10.
International Search Report and Written Opinion for International Patent Application No. PCT/US2022/036006 mailed Oct. 4, 2022, pp. 1-8.
Office Communication for U.S. Appl. No. 17/876,333 mailed Feb. 21, 2023, pp. 1-22.
Office Communication for U.S. Appl. No. 17/876,333 mailed Mar. 1, 2023, pp. 1-2.
International Search Report and Written Opinion for International Patent Application No. PCT/US2022/050626 mailed Mar. 7, 2023, pp. 1-8.
Office Communication for U.S. Appl. No. 18/222,780 mailed Sep. 15, 2023, 10 Pages.
Office Communication for U.S. Appl. No. 18/130,080 mailed Sep. 28, 2023, 43 Pages.
Office Communication for U.S. Appl. No. 18/225,833 mailed Sep. 15, 2023, 19 Pages.
Office Communication for U.S. Appl. No. 17/895,489 mailed Apr. 11, 2023, pp. 1-36.
International Search Report and Written Opinion for International Patent Application No. PCT/US2022/037299 mailed Oct. 25, 2022, pp. 1-7.
International Search Report and Written Opinion for International Patent Application No. PCT/US2022/038724 mailed Nov. 1, 2022, pp. 1-7.
International Search Report and Written Opinion for International Patent Application No. PCT/US2022/041520 mailed Nov. 8, 2022, pp. 1-7.
International Search Report and Written Opinion for International Patent Application No. PCT/US2023/013718 mailed May 30, 2023, pp. 1-7.
Office Communication for U.S. Appl. No. 18/130,080 mailed Jun. 20, 2023, pp. 1-36.
Office Communication for U.S. Appl. No. 17/895,489 mailed Jul. 5, 2023, pp. 1-13.
International Search Report and Written Opinion for International Patent Application No. PCT/US2023/015227 mailed Jun. 27, 2023, pp. 1-7.

(56) References Cited

OTHER PUBLICATIONS

International Search Report and Written Opinion for International Patent Application No. PCT/US2023/028551 mailed Oct. 24, 2023, 09 Pages.
Office Communication for U.S. Appl. No. 17/856,690 mailed Jul. 10, 2024, 11 Pages.
Office Communication for U.S. Appl. No. 17/856,690 mailed Jul. 24, 2024, 4 Pages.
International Preliminary Report on Patentability for International Patent Application No. PCT/US2022/036006 mailed Jan. 11, 2024, 6 Pages.
International Preliminary Report on Patentability for International Patent Application No. PCT/US2022/037299 mailed Jan. 25, 2024, 5 Pages.
International Preliminary Report on Patentability for International Patent Application No. PCT/US2022/038724 mailed Feb. 8, 2024, 5 Pages.
International Preliminary Report on Patentability for International Patent Application No. PCT/US2022/041520 mailed Mar. 7, 2024, 5 Pages.
International Preliminary Report on Patentability for International Patent Application No. PCT/US2022/050626 mailed Jun. 6, 2024, 6 Pages.
Office Communication for U.S. Appl. No. 18/488,123 mailed Jan. 2, 2024, 10 Pages.
Office Communication for U.S. Appl. No. 17/865,794 mailed Aug. 21, 2024, 12 Pages.
International Preliminary Report on Patentability for International Patent Application No. PCT/US2023/015227 mailed Sep. 26, 2024, 5 Pages.
Office Communication for U.S. Appl. No. 18/504,052 mailed Aug. 22, 2024, 7 Pages.
International Preliminary Report on Patentability for International Patent Application No. PCT/US2023/013718 mailed Sep. 6, 2024, 5 Pages.
International Preliminary Report on Patentability for International Patent Application No. PCT/US2023/017271 mailed Oct. 17, 2024, 5 Pages.
Office Communication for U.S. Appl. No. 18/618,909 mailed Nov. 20, 2024, 9 Pages.
Extended European Search Report for European Patent Application No. 21907668.4 mailed on Dec. 6, 2024, 10 pages.
Office Communication for U.S. Appl. No. 18/221,816 mailed Dec. 6, 2024, 27 Pages.
Office Communication for U.S. Appl. No. 18/504,052 mailed Dec. 9, 2024, 6 Pages.
International Preliminary Report on Patentability for International Patent Application No. PCT/US2023/028551 mailed Feb. 6, 2025, 07 Pages.
Office Communication for U.S. Appl. No. 18/221,816 mailed May 14, 2025, 9 Pages.

\* cited by examiner

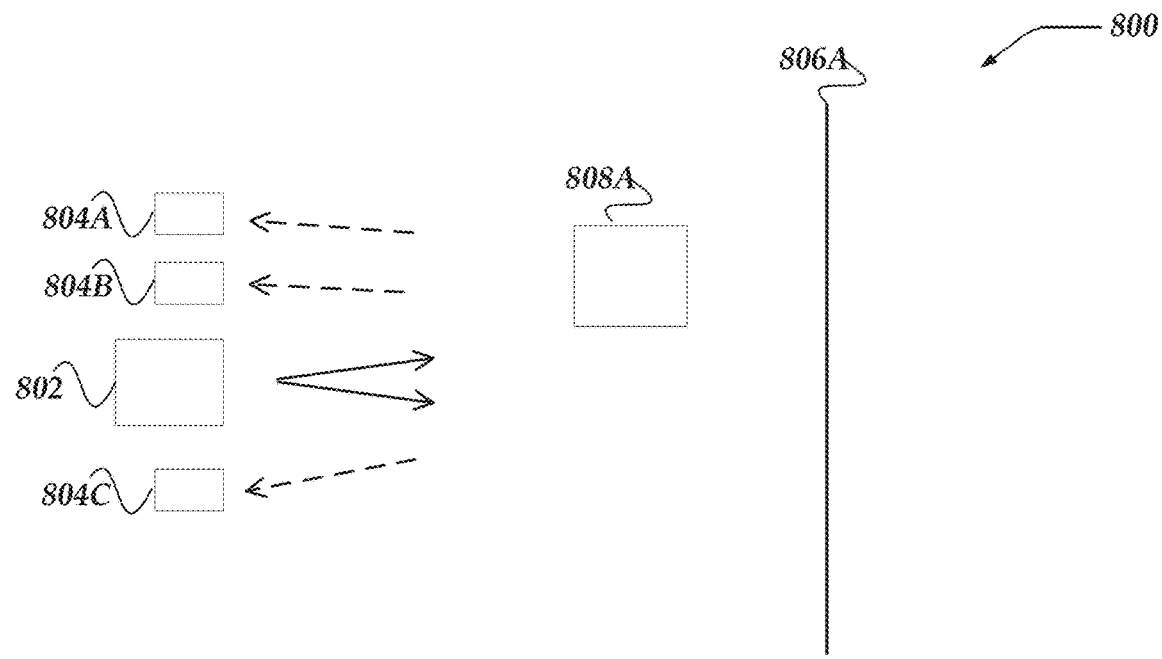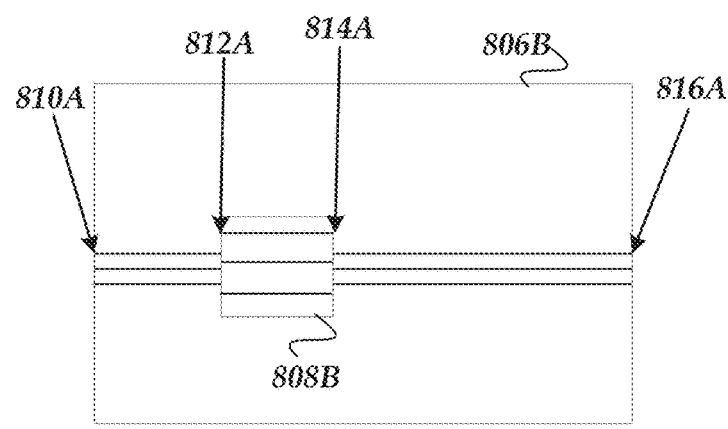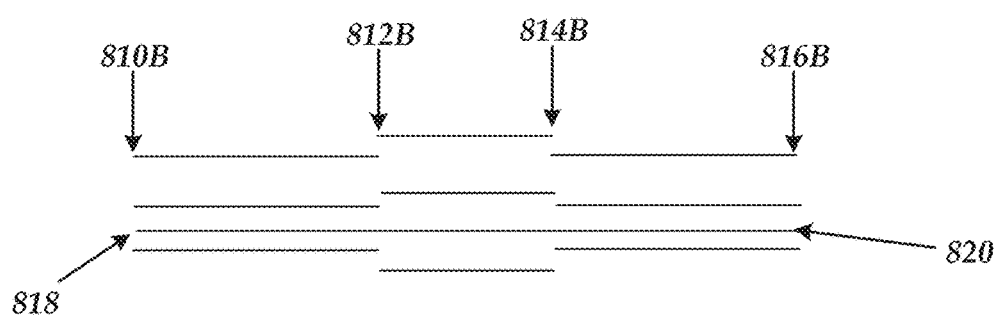
Fig. 8

PERCEIVING OBJECTS BASED ON SENSING SURFACES AND SENSING SURFACE MOTION

CROSS-REFERENCE TO RELATED APPLICATION

This application is a Utility Patent application based on previously filed U.S. Provisional Patent Application Ser. No. 63/205,480 filed on Dec. 14, 2020, the benefit of the filing date of which is hereby claimed under 35 U.S.C. § 119(e) and the contents of which is further incorporated in entirety by reference.

TECHNICAL FIELD

The present invention relates generally to machine sensing or machine vision systems, and more particularly, but not exclusively, to perceiving objects based on sensing surfaces and sensing surface motion.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g. Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g. brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by a machine vision applications, such as, robotic planning and control systems, these 2D or 3D data need to be processed by machine vision algorithms implemented in software or hardware. In some cases, some machine vision systems may employ machine learning be employed to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment. Likewise, they often represent scene using static data captured from sensors fundamental data about the scene may be filtered out before the data may be provided to the machine vision algorithms for processing. Accordingly, conventional machine vision systems are disadvantaged because they may rely on such inaccurate or unrepresentative scene data to perform machine vision analysis. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical representation of a scanning system for perceiving objects based on sensing surfaces and sensing surface motion in accordance with one or more of the various embodiments;

DETAILED DESCRIPTION OF VARIOUS EMBODIMENTS

Figure 1:
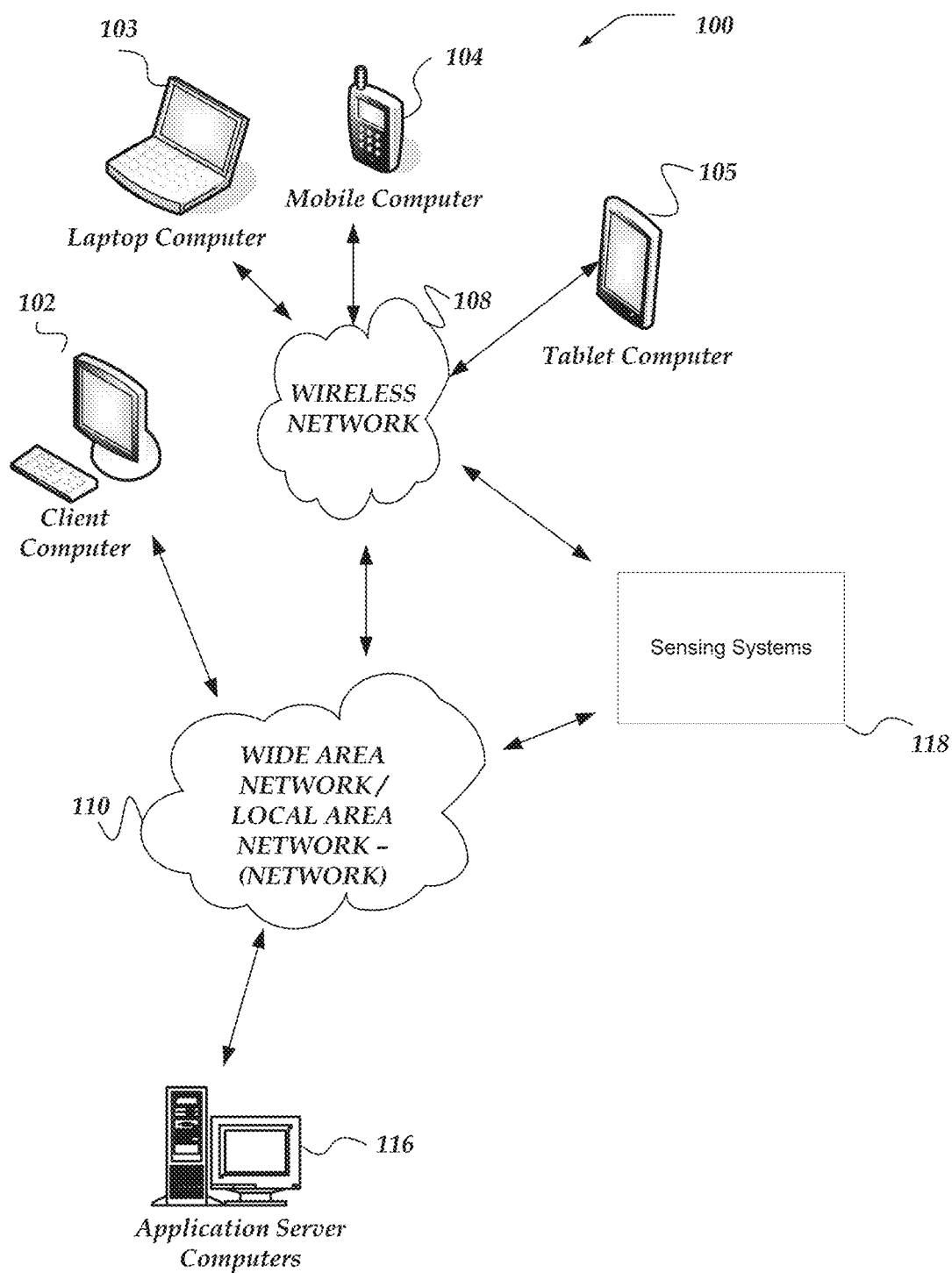
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "scanning signal generator" refers to a system or device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generator are not strictly limited to lasers or laser MEMS, other type of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan up to frequencies of 10 s of kHz. The scanning signal generators may be controlled in a closed loop fashion with one or more processor that may provide feedback about objects in the environment and instructs the scanning signal generator to modify its amplitudes, frequencies, phase, or the like.

As used herein the term "sensor" refers to a device or system that can detect reflected energy from scanning signal generator. Sensors may be considered to comprise an array of detector cells that are responsive to energy reflected from scanning signal generators. Sensors may provide outputs that indicate which detector cells are triggered and the time they are triggered. Sensors may be considered to generate a sensor output that reports the cell location and time of detection for individual cell rather than being limited reporting the state or status of every cell. For example, sensors may include event sensor cameras, SPAD arrays, SiPM arrays, or the like.

As used herein the terms "trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to perceiving surfaces and objects. In one or more of the various embodiments, one or more trajectories may be generated based on a continuous stream of sensor events such that each trajectory may be a parametric representation of a one-dimensional curve segment in a three-dimensional space.

In one or more of the various embodiments, the one or more trajectories may be employed to determine the one or more surfaces.

In one or more of the various embodiments, the one or more trajectories may be provided to a modeling engine to execute one or more actions based on the one or more trajectories and the one or more surfaces.

In one or more of the various embodiments, in response to one or more changes to the one or more surfaces, further actions may be performed, including: updating the one or more trajectories based on the continuous stream of sensor events; executing one or more additional actions based on the one or more updated trajectories and the one or more changed surfaces; or the like.

In one or more of the various embodiments, the one or more changes to the one or more surfaces may include one or more of a position change, an orientation change, a motion change, a deformation of the one or more surfaces, or the like.

In one or more of the various embodiments, the continuous stream of sensor events may be provided based on one or more sensors such that each sensor event includes one or more of a timestamp, time of flight, or location values.

In one or more of the various embodiments, one or more shapes that correspond to the one or more surfaces may be determined based on one or more characteristics of the one or more surfaces and the one or more trajectories.

In one or more of the various embodiments, each trajectory may further include a parametric representation of a B-spline.

In one or more of the various embodiments, the one or more trajectories may be employed to continuously determine one or more changes to one or more of a position of the one or more surfaces, an orientation of the one or more surfaces, a deformation of the one or more surfaces, a motion of the one or more surfaces, or the like.

In one or more of the various embodiments, the modeling engine may be arranged to perform further actions including, determining one or more objects based on a portion of the one or more trajectories that may be associated with a portion of the one or more surfaces.

In one or more of the various embodiments, the modeling engine may be arranged to perform further actions including, determining one or more features of the one or more objects based on the one or more trajectories such that the one or more features include one or more of a position, an orientation, a motion or a deformation of the one or more objects.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
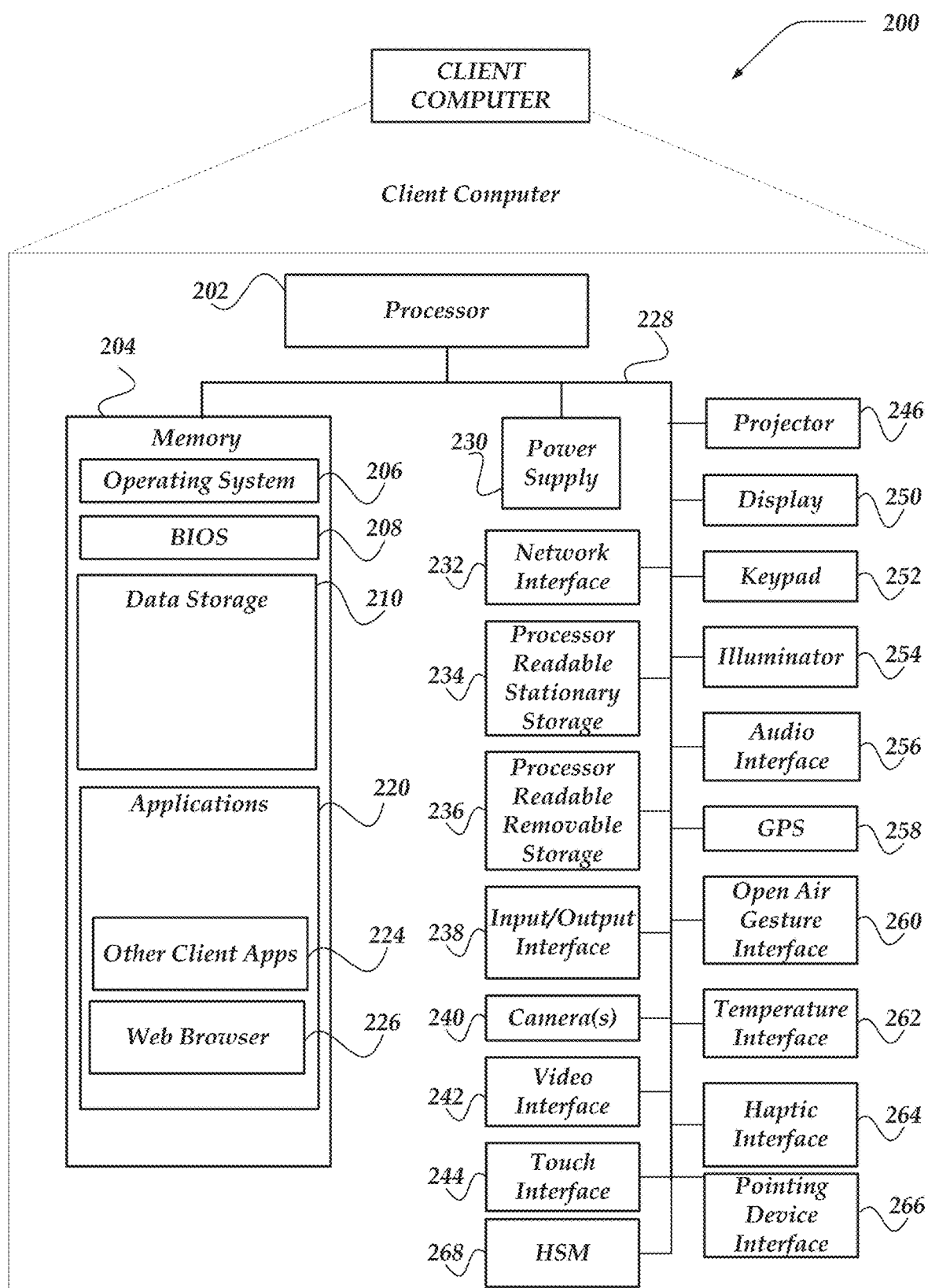
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
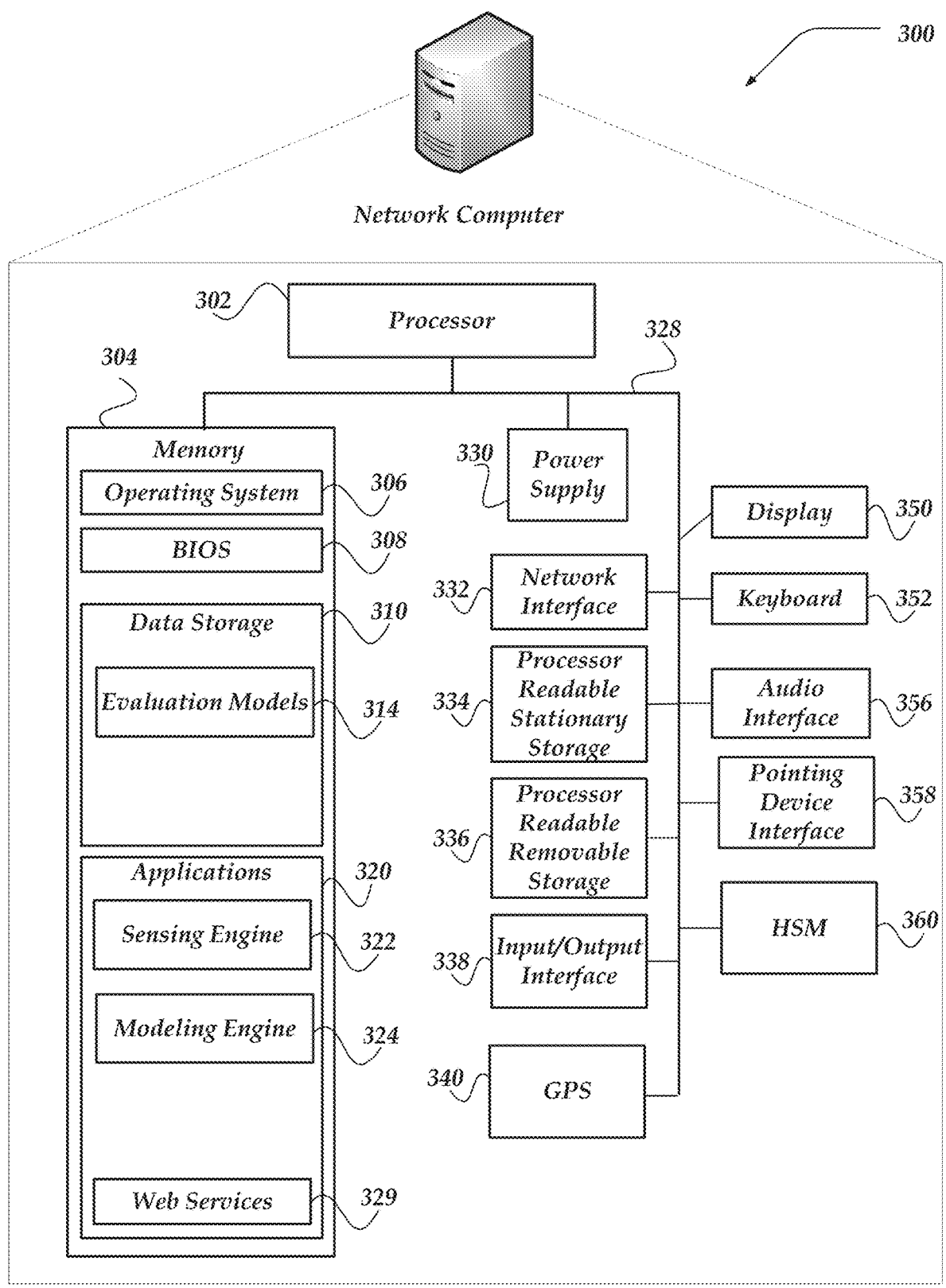
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, evaluation models 314, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, web services 329, or the like, may be provisioned and de-commissioned automatically.

Also, in one or more of the various embodiments, sensing engine 322, modeling engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
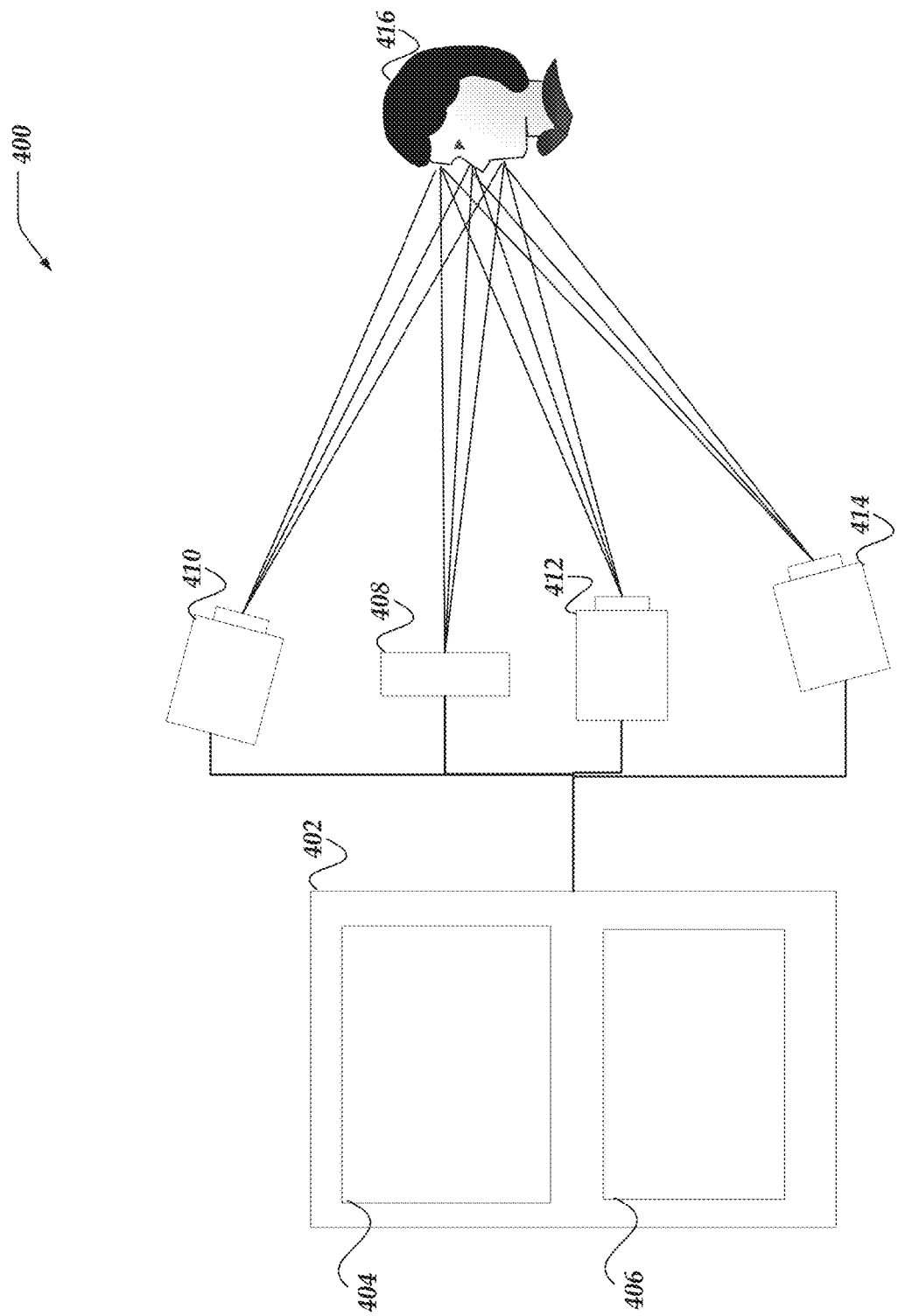
FIG. 4 illustrates a logical architecture of a system for perceiving objects based on sensing surfaces and sensing surface motion in accordance with one or more of the various embodiments.

FIG. 4 illustrates a logical architecture of system 400 for perceiving objects based on sensing surfaces and sensing surface motion in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 404; one or more sensing engines, such as, sensing engine 406.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more sensors that may receive the reflected signal energy. In this example, for some embodiments, the sensors may be considered sensors that may be arranged to generate sensor information that corresponds to the reflected signal energy. In this example, sensors, such as, sensor 410, sensor 412, sensor 414 may be considered to be CCDs, or the like, that provide two-dimensional (2D) sensor information based on the CCD cells that detect the reflected signal energy.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to employ direct the signal generator (e.g., scanning laser 408) to follow a specific pattern based on one or more path-functions. Thus, in some embodiments, signal generators may scan the subject area using a known and precise path that may be defined or described using one or more function that correspond to the curve/path of the scanning.

Accordingly, in some embodiments, sensing engines may be arranged to synthesize information about the objects or surfaces scanned by the signal generate based on the 3D sensor information provided by the sensors and the known scanning curve pattern.

In some embodiments, scanning signal generator 408 may implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10 s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generator may be arranged to periodically switch on and off, such as, at points if the scanner may be slowing before changing direction or reversing direction.

In some embodiments, system 400 may include two or more sensors, such as, sensor 410, sensor 412, sensor 414, or the like. In some embodiments, sensors may comprise arrays of pixels or cells that are responsive to reflected signal energy. In some embodiment, sensors may be arranged such that some or all of the sensors share a portion of their fields of view with one another and with the scanning signal generator. Further, in some embodiments, the relative position and poses of each sensor may be known. Also, in some embodiments, each sensor employs synchronized clock. For example, in some embodiments, sensors may be time synchronized by using a clock of one sensor as the master clock or by using an external source that periodically sends a synchronizing signal to the sensors. Alternatively, in some embodiments, sensors may be arranged to provide sensor events to sensing engines independently or asynchronously of each other.

Accordingly, as a beam from the scanning signal generator beam scans across the scene, the sensors receive the reflected signal energy (e.g., photons/light from lasers) and trigger events in their cells/pixels based on observing physical reflections in the scene. Accordingly, in some embodiments, each event (e.g., sensor event) in a sensor may be determined based on cell location and a timestamp based on where and when the reflected energy is detected in each sensor. Thus, in some embodiments, each sensor reports each sensor event independently as it is detected rather than collecting information/signal from the entire sensor array before providing the sensor event. This behavior may be considered distinguishable from many conventional pixel arrays or CCDs which may 'raster scan' the entire array of cells before outputting signal data. In contrast, sensors, such as, sensor 410, sensor 412, sensor 414, or the like, may immediately and continuously report signals (if any) from individual cells. Accordingly, the cells in an individual sensor do not share a collective exposure time rather each cell reports its own detection events. Accordingly, in some embodiments, sensors, such as, sensor 410, sensor 412, sensor 414, or the like, may be based on Event Sensor cameras, SPAD, SiPM arrays, or the like.

Figure 5:
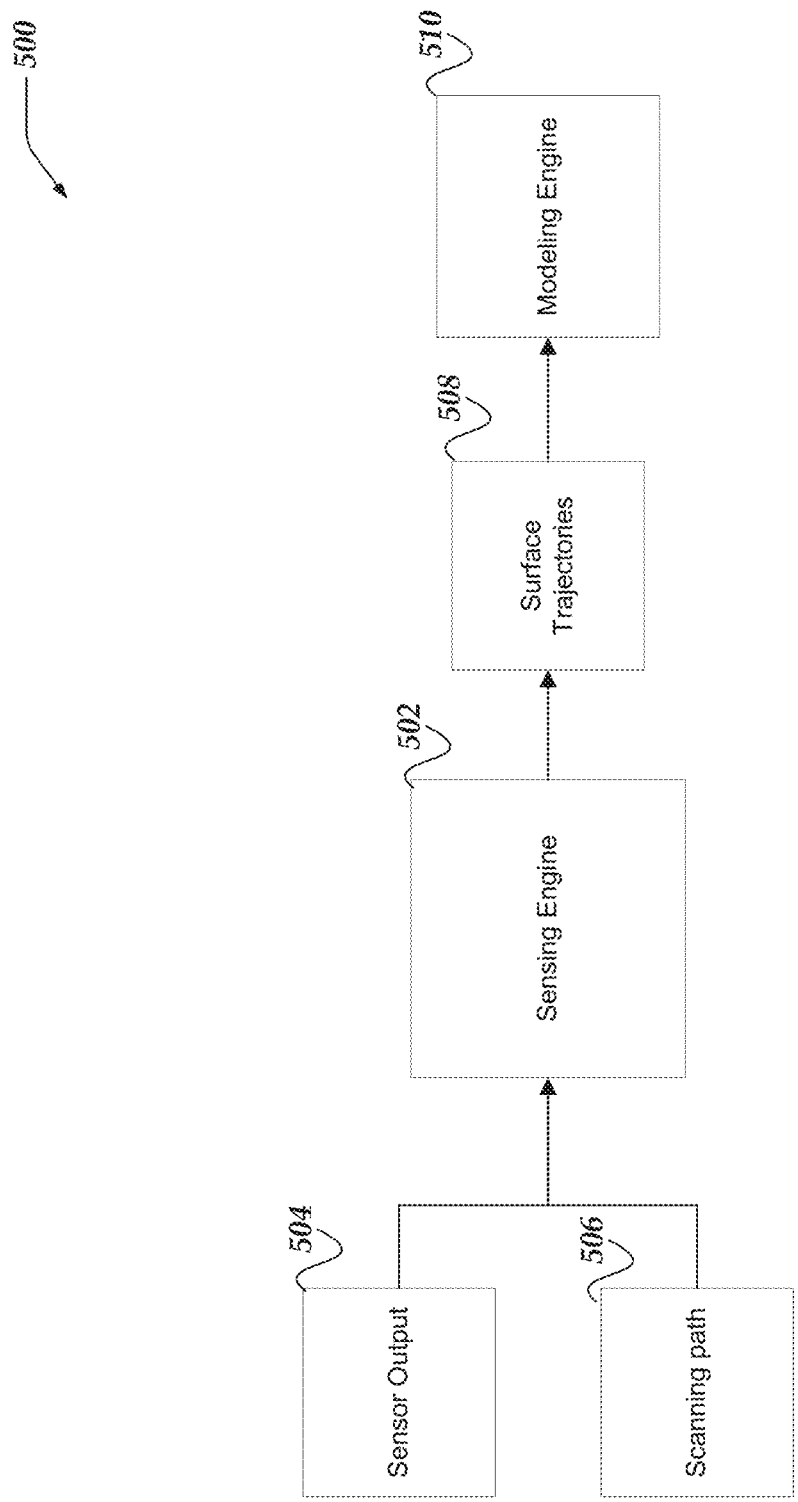
FIG. 5 illustrates a logical schematic of a system for perceiving objects based on sensing surfaces and sensing surface motion in accordance with one or more of the various embodiments.

FIG. 5 illustrates a logical schematic of system 500 for perceiving objects based on sensing surfaces and sensing surface motion in accordance with one or more of the various embodiments. In some embodiments, sensing engines, such as, sensing engine 502 may be arranged to be provided sensor outputs that represent sensor information, such as, location, timing. As described above, in some embodiments, signal generators, such as, scanning lasers may scan an area of interest such that reflections of the energy may be collected by sensors. Accordingly, in some embodiments, information from each sensor may be provided to sensing engine 502.

Also, in some embodiments, sensing engine 502 may be provided a scanning path that corresponds the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to generate sensor events correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning laser) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based the scan path and the sensor information synthesized from the sensor output 504.

Figure 6:
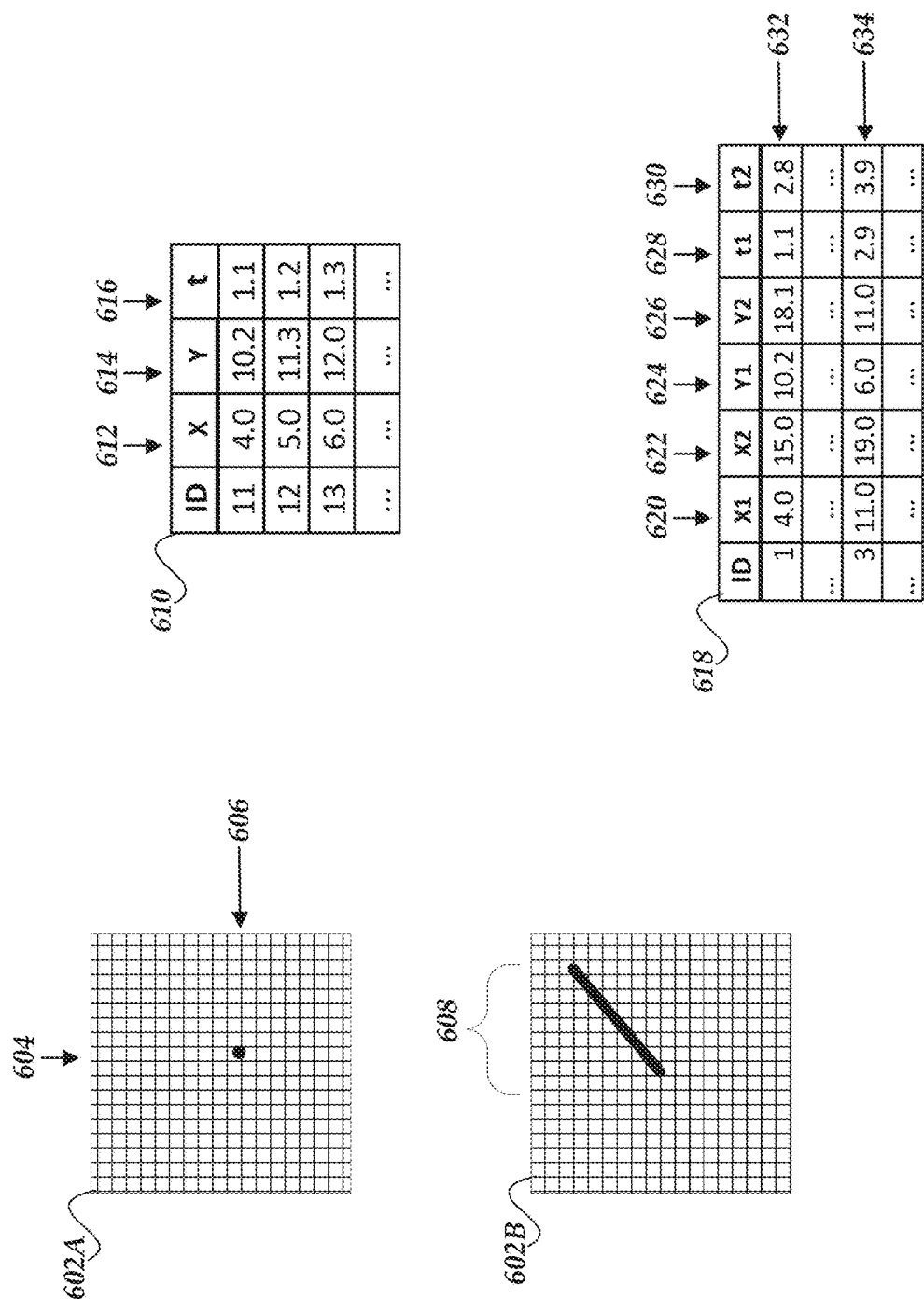
FIG. 6 illustrates a logical representation of sensors and sensor output information for perceiving objects based on sensing surfaces and sensing surface motion in accordance with one or more of the various embodiments.

FIG. 6 illustrates a logical representation of sensors and sensor output information for perceiving objects based on sensing surfaces and sensing surface motion in accordance with one or more of the various embodiments.

In one or more of the various embodiments, sensing engines may be provided sensor output from various sensors. In some embodiments, the particular sensor characteristics may vary depending on the particular application that perceiving objects based on sensing surfaces and sensing surface motion may be directed towards. In this example, for some embodiments, sensor 602A may be considered to represent a generic sensor that can emit signals that correspond to the precise location on the sensor where reflected energy from the scanning signal generator may be detected. For example, sensor 602A may be considered an array of detector cells that reports the cell location that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflect energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using a various curves including Lissajous curves, 2D lines, or the like. In some cases, scanning path curves may be considered piecewise function in that they change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represent a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associated sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy paths detected by the sensors. In some embodiments, sensing engines may be arranged to employ one or more data structures, such as, data structure 618 to represent a trajectory that are determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
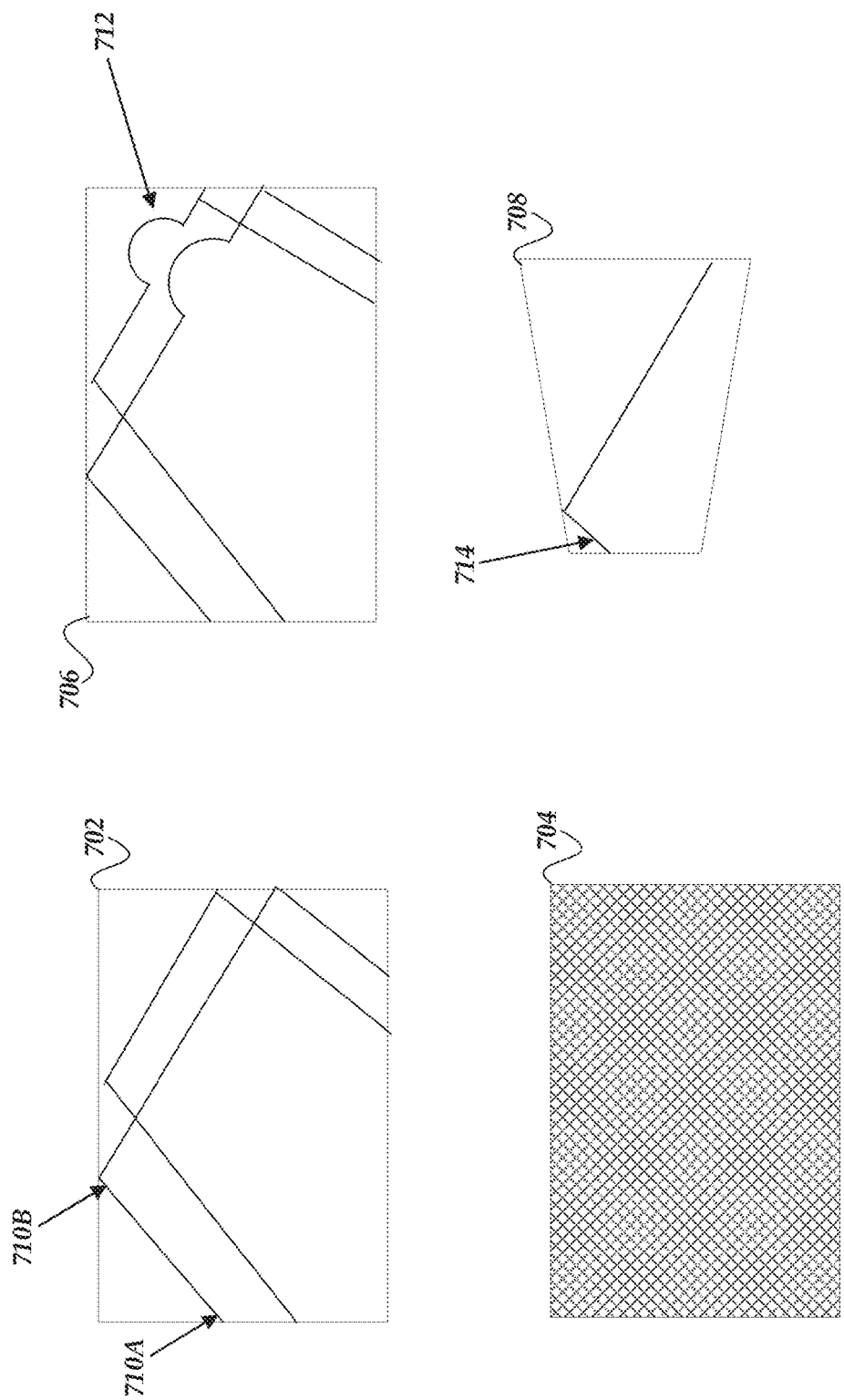
FIG. 7 illustrates logical representations of scanning paths for perceiving objects based on sensing surfaces and sensing surface motion in accordance with one or more of the various embodiments.

FIG. 7 illustrates logical representations of scanning paths for perceiving objects based on sensing surfaces and sensing surface motion in accordance with one or more of the various embodiments. In some embodiments, sensing engines may be arranged to collect sensor output based on reflected scanning signal energy. In some embodiments, sensing engines may be arranged to interpret the sensor output information based in part on the scanning path of the scanning signal generator.

In one or more of the various embodiments, sensing engines may be arranged to direct scanning signal generators to traverse a particular path defined by one or more curve functions. For example, scanned surface 702 represents a surface that is being scanned using scanning path 710. Accordingly, in some embodiments, the sensing engine may anticipate or predict that the reflected energy to adheres to the scanning path. In this example, surface 702 is scanned using a straight-line linear path that may correspond to particular 2D line function. In this example, only a portion of the scanning pattern is illustrated.

Likewise, for some embodiments, surface 704 illustrates how rapid scanning may cover an entire surface. In some embodiments, the coverage of the scan may vary depending on the scanning path, scanning frequency, or the like, and may be adapted to various applications or various environments. For example, some applications may require finer more precise scanning than other environments depending on various characteristics of the surfaces or objects being scanned.

In some embodiments, the observed scanning path collected by sensors may deviate from the planned scanning path because of objects or surface features that alter the observed or reflected scanning paths. For example, surface 706 illustrates scanning paths similar to those shown for surface 702, however, at path portion 712 the scanning path appears deformed. In this example, this represents how an intervening object or surface feature may alter the reflected scanning energy path that may be observed by sensors. For example, comparing the scanning paths of surface 702 and the scanning paths of surface 706 may indicate that an object or surface feature may be present in surface 706 and absent from surface 702.

Also, in some embodiments, deflections in the observed scanning path may correspond to the orientation of the scanned surface relative to the scanning signal generator or the sensors. For example, for some embodiments, surface 708 may represent a surface that is rotated relative to surface 702 and the scanning signal generator (not shown). Accordingly, in some embodiments, sensing engines may be arranged to determine the surface orientation based on comparing the scanning path and the actual reflected scanning path to determine that the surface may be rotated relative to the signal generator. Thus, in this example, the scanning path that produces trajectory 714 and trajectory 710A/710B may be considered to be similar. However, in this example, the trajectories themselves are different because of the differences in the orientation of scanned surfaces. Accordingly, in some embodiments, modeling engines may be arranged to detect or characterize differences between the scanning path and the reflected path detected by sensors to determine that surface 708 may be rotated relative to the sensing system.

Further, in some embodiments, as described above, sensing engines may be arranged to collect a sequence of trajectories that correspond to the reflected scanning energy detected by the sensors. In this example, for some embodiments, location 710A may represent the beginning of a trajectory and location 710B may represent an endpoint of the trajectory. Note, the trajectory may represent many sensor events that are related together to determine the trajectory. In this example, the scanning signal generator may be assumed to be configured to change direction if it reaches the edge of the scanning environment. Accordingly, in this example, the location where the scanning signal generator changes direction may be treated as a discontinuity that ends one trajectory and begins another trajectory.

In one or more of the various embodiments, sensing engines may be arranged to direct scanning paths such that the curves of the path may cross one another. Accordingly, in some embodiments, if scanning path crosses itself normal to the surface being scanned may be calculated by determining the tangent lines to each of the trajectories at the crossing point. In some embodiments, sensing engines may be arranged to compute the normal to the scanned surface up to a sign by computing the cross product of the tangent lines. In some embodiments, sensing engines may be arranged to determine the sign of the normal by selecting the direction of the normal that points most closely to the direction back to the sensor system, since that is the only physically possible orientation of the surface that could have been seen by the sensor system. In addition, in some embodiments, the curvatures of the individual trajectories of the scanning path across the surfaces or objects may be used to approximate the curvature of the two-dimensional surfaces. For example, one of ordinary skill in the art will appreciate that crossing 1D B-splines embedded in 3D space may be used to estimate a 2D surface B-spline embedded in 3D space. Furthermore, in some embodiments, as more 1D curves traverse the area parameterized by the 2D surface B-spline, sensing engines may be arranged to further refine the 2D surface B-spline to better approximate the object surface.

FIG. 8 illustrates a logical representation of scanning system 800 for perceiving objects based on sensing surfaces and sensing surface motion in accordance with one or more of the various embodiments. As described above, scanning systems, such as, scanning system 800 may comprise: one or more scanning signal generators, such as, scanning signal generator 802; multiple sensors, such as, sensor 804A, sensor 804B, sensor 804C, or the like. Note, it may be assumed that one or more sensing engines (not shown) or modeling engines (not shown) may be communicatively coupled with scanning signal generator 802 and sensor 804A, sensor 804B, sensor 804C, or the like. Alternatively, in some embodiments, one or more sensing engines or modeling engines may be hosted by the same computers, devices, or appliances that may be providing scanning signals or sensors, such as, robots, autonomous vehicles, or the like.

Further, in this example, surface 806A represents a top-down view of a surface in the scanning environment. And, in this example, object 808A represents a top-down view of an object the intervenes between surface 806A and scanning signal generator 802. As described herein, scanning signal generator 802 may be a scanning laser configured to traverse a defined scanning path at a defined scanning rate. Likewise, as described herein, sensor 804A, sensor 804B, sensor 804C, or the like, may provide sensor output to sensing engines based on energy reflected from surface 806A and object 808A. Accordingly, in some embodiments, sensing engines may be arranged to generate trajectories that correspond to the sensing output and the scanning paths.

In this example, for some embodiments, surface 806B represents the same surface as surface 806A viewed from the front. Likewise, in this example, object 808B represents the same object as object 808A viewed from the front. Further, in this example, for some embodiments, various locations are illustrated to represent start locations or endpoints of trajectories that may be determined from the sensor output. Note, for clarity, the border lines illustrating object 808B are included here—they should not be confused as representing trajectories or sensor outputs.

In this example, for some embodiments, sensing engines may be arranged to determine trajectories based on the sensor output. In this example, trajectories may be determined such as: a first trajectory defined by location 810A through location 812A; a second trajectory defined by location 812A through location 814A; a third trajectory defined by location 814A through location 816A; or the like. Note, as described herein, trajectories also include a time component that for brevity and clarity is omitted here.

Further, in this example, location 810B, location 812B, location 814B, location 816B maybe considered to represent a close in view of the same locations described above. However, location 818 and location 820 may correspond to a trajectory that does not include a break/gap.

Accordingly, in some embodiments, modeling engines may be arranged to determine information such as, object shapes, object features, object locations, object motion, object rotation, surface features, surface orientation, or the like, based on evaluating the trajectories that may be determined by sensing engines. For example, here a sensing engine may determine trajectories based on location 810B, location 812B, location 814B, location 816B, or the like. Also, for example, sensing engines may determine a trajectory based on location 818 and location 820. In some embodiments, sensing engines may be arranged to compare/evaluate sequences of trajectories to determine information about the scanned environment. In this example, sensing engines may be arranged to recognize an object because of changes to the trajectories during scanning. In this example, a scan line that results in one trajectory that appears next to another scan line that results in multiple trajectories may indicate the presences of an intervening object of surface feature.

Figure 9:
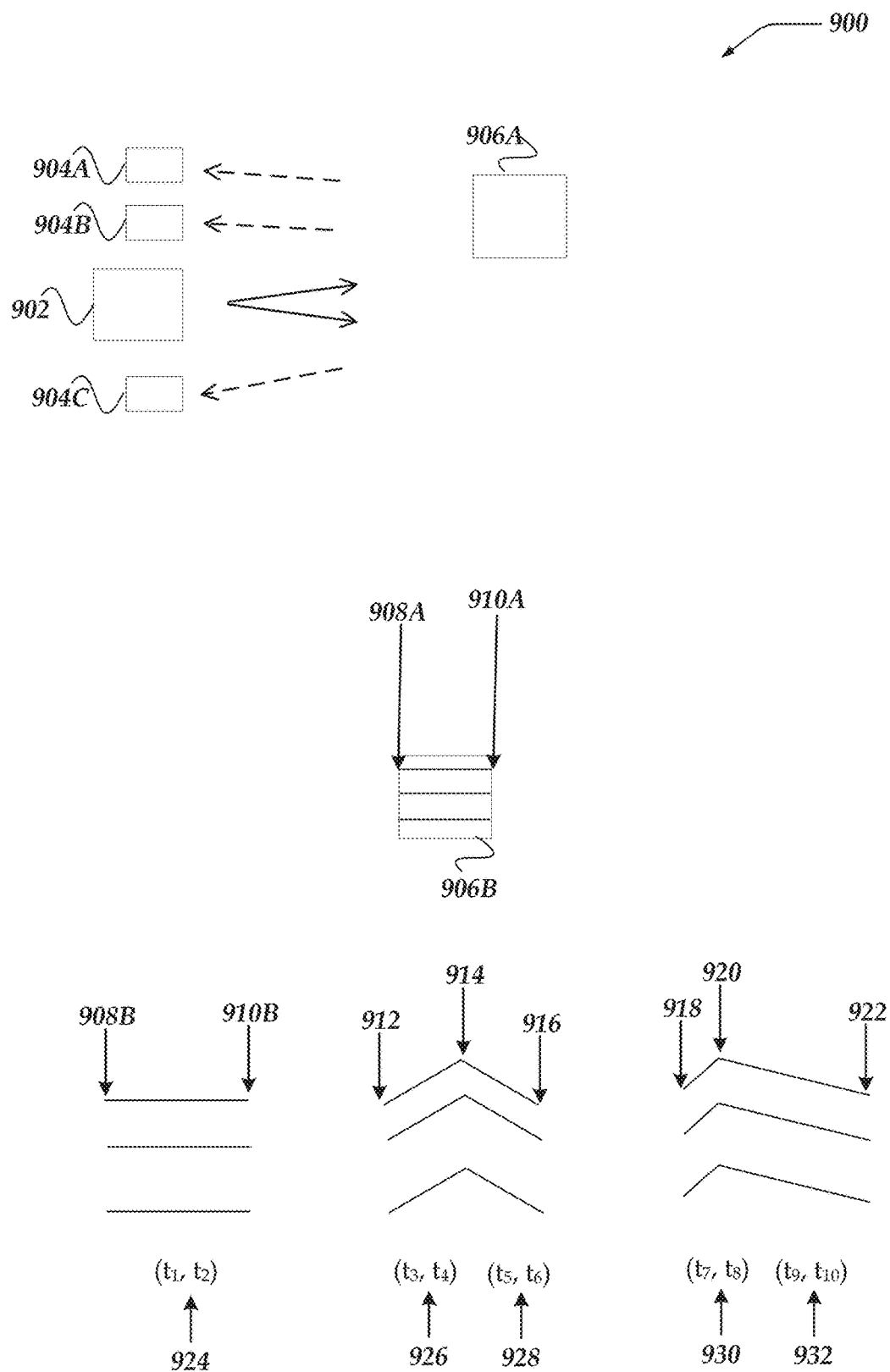
FIG. 9 illustrates a logical representation of a scanning system for perceiving objects based on sensing surfaces and sensing surface motion in accordance with one or more of the various embodiments.

FIG. 9 illustrates a logical representation of scanning system 900 for perceiving objects based on sensing surfaces and sensing surface motion in accordance with one or more of the various embodiments. As described above, scanning systems, such as, scanning system 900 may comprise: one or more scanning signal generators, such as, scanning signal generator 902; multiple sensors, such as, sensor 904A, sensor 904B, sensor 904C, or the like. Note, it may be assumed that one or more sensing engines or modeling engines may be communicatively coupled with scanning signal generator 902 and sensor 904A, sensor 904B, sensor 904C, or the like. Alternatively, in some embodiments, one or more sensing engines or modeling engines may be hosted by the same computers or appliances that may be providing scanning signals or sensors, such as, robots, autonomous vehicles, or the like.

Note, scanning system 900 may be considered to be similar to scanning system 800 described above. Accordingly, for brevity and clarity one or more features or embodiments described for scanning system 800 may be omitted here.

In one or more of the various embodiments, scanning systems may be arranged to scan scanning environments that do not have clearly defined background surfaces. Accordingly, in some embodiments, scanning systems may be directed to determining or identifying objects or object activity that may be occurring in space such that sensor output may not provide information about the background surface. However, in some embodiments, sensing engines may be arranged to evaluate sensor outputs associated with one or more objects absent information associated with a background surface. Accordingly, in this example, object 906A represents a top-down view of an object that may be scanned by scanning signal generator 902.

In one or more of the various embodiments, sensing engines may be arranged to generate one or more trajectories for objects similarly to how trajectories for surfaces may be generated. In this example, for some embodiments, 906B represents the same object as object 906A—viewed from the point of view of the scanning signal generators or sensors. Accordingly, in this example, for some embodiments two or more locations, such as, location 908A and location 910A along with a start time and an end time may be employed to determine trajectories that may be associated with object 906B. Also, in this example, trajectories may be determined based on object 906B absent trajectories associated with a background surface.

Further, in this example, location 908B and location 910B represent a close in view of location 908A and location 910A. Accordingly, in some embodiments, modeling engines may be arranged to identify one or more features associated with object 906A/906B based on an analysis of the trajectories associated with the scanned object, such as, object features, object location, object motion, object rotation, or the like.

Accordingly, in some embodiments, sensing engines may be arranged to determine trajectories for objects in a scanning environment even though the scanning environment does not include a surface background. For example, for some embodiments, sensing engines the determine trajectories such as: a first trajectory with a start point of location 912 and an endpoint of location 914; a second trajectory with a start point of location 914 and an endpoint of location 916; or the like, for objects similar to object 906A/B that may be rotating. Accordingly, in this example, for some embodiments, modeling engines may be arranged to infer that object 906A/B may be a cube that may be rotating.

Further, in some embodiments, modeling engines may be arranged to infer various features associated with objects based on comparing how trajectories change overtime. As shown here, in this example, time period 924 may represent a start time and an end time associated with the trajectory that has location 908B as its start point and location 910B as its endpoint. Likewise, in this example, time period 926 may represent a start time and an end time associated with the trajectory that has location 912 as its start point and location 914 as its endpoint; time period 928 may represent a start time and an end time associated with the trajectory that has location 914 as its start point and location 916 as its endpoint; time period 930 may represent a start time and an end time associated with the trajectory that has location 918 as its start point and location 920 as its endpoint; and time period 932 may represent a start time and an end time associated with the trajectory that has location 920 as its start point and location 922 as its endpoint.

Accordingly, in some embodiments, modeling engines may be arranged to infer from the trajectories described above that object 906A/906B may be a rotating cube by evaluating the trajectories as they occur overtime.

Figure 10:
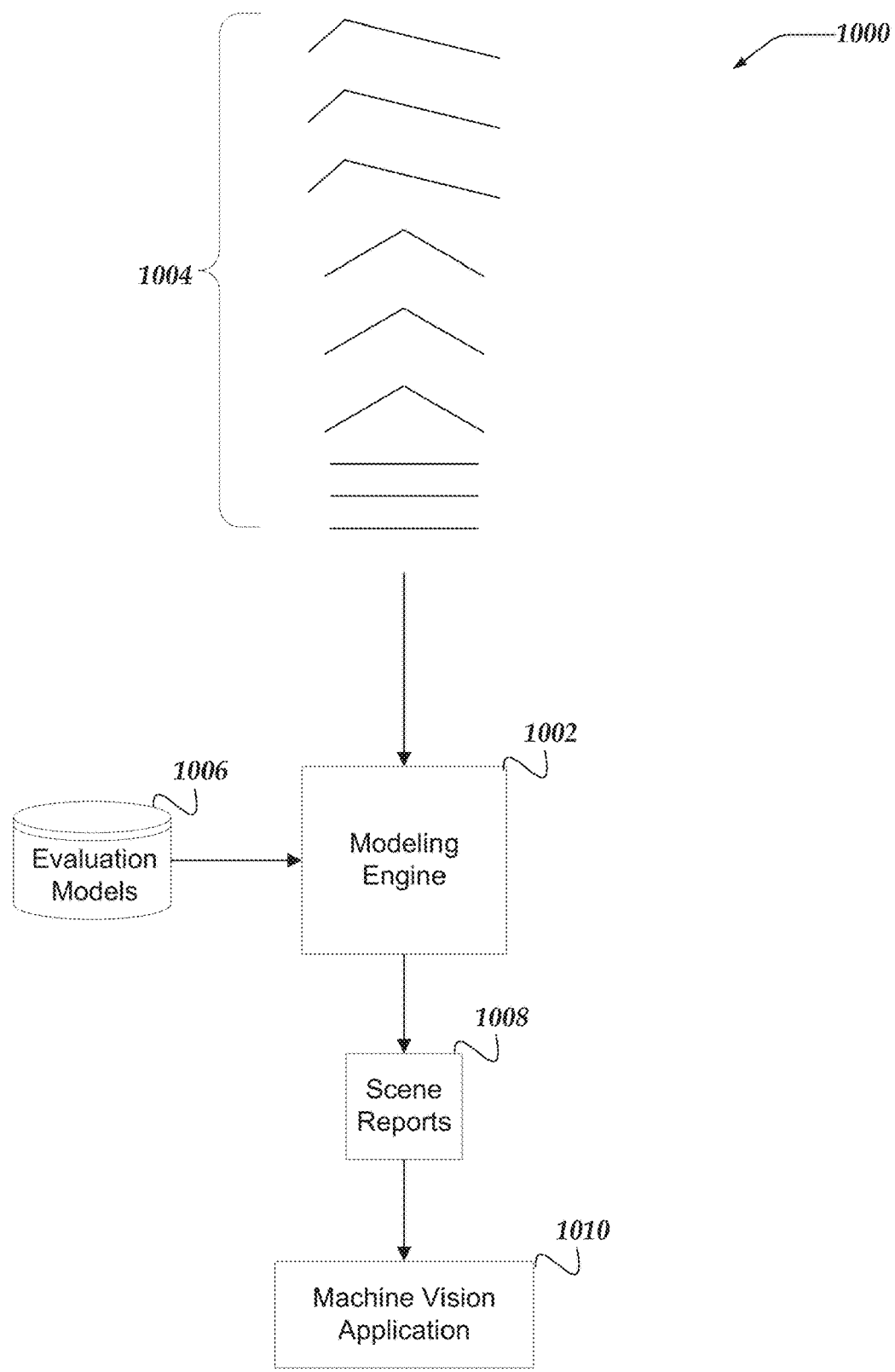
FIG. 10 illustrates a logical schematic of a system for perceiving objects based on sensing surfaces and sensing surface motion in accordance with one or more of the various embodiments.

FIG. 10 illustrates a logical schematic of system 1000 for perceiving objects based on sensing surfaces and sensing surface motion in accordance with one or more of the various embodiments. As described above, in some embodiments, sensing engines may be arranged to generate trajectory information based on sensor output collected based on reflected signal energy.

Accordingly, in some embodiments, modeling engines, such as, modeling engine 1002 may be arranged to receive trajectory information, such as, trajectory information 1004. In this example, for brevity and clarity trajectory information 1004 is illustrated using drawings that may be representative of the trajectory information. However, in some embodiments, sensing engine mb to provide modeling engines parameterized trajectory information provided via one or more data structures, such as, data structure 618 shown in FIG. 6.

Accordingly, modeling engine 1002 may be arranged to employ evaluation models 1006 to evaluate trajectory information 1004. In some embodiments, evaluation models may be configured to include one or more heuristics, rules, conditions, machine learning classifiers, or the like, that may be employed to evaluate the scanned environment based on trajectory information 1004. In some embodiments, evaluation models may be conventionally trained or tuned to recognize or perceive various objects, shapes, actions, activities, relationships between or among objects, or the like. However, in some embodiments, input data used for training or tuning evaluation models may be in the form of numerical representations of trajectories (e.g., a stream of updating parametric representation of analytical curve segments rather than information derived from point clouds, video frame captures, pixel based edge detection, pixel based motion detection, pixel based color/brightness gradients, or the like).

In some embodiments, if trajectory information 1004 may be evaluated, modeling engines may be arranged to generate or update one or more scene reports that provide information about the evaluated scenes. In some embodiments, scene reports may comprise conventional reports, interactive reports, graphical dashboards, charts, plots, or the like. Also, in some embodiments, scene reports may comprise one or more data structures that include information that may represent various scene features that may further be provided to one or more machine vision applications, such as, machine vision application 1010 that may automatically interpret the scene reports.

One of ordinary skill in the art will appreciate that many machine vision or machine perception applications may employ the innovation described herein. For example, in one or more of the various embodiments, the combination of high-speed surface scanning and low latency, high throughput sensors, arranged in a configuration that provides a direct depth measurement, may enable sensing engines to scan the entire field of view in one millisecond, measuring surfaces with a radial precision on the scale of a human nose at 30 meters or the individual threads on an M3 screw at 0.5 meters. Also, in some embodiments, sensing engines may be arranged to progressively scans the environment. Accordingly, in some embodiments, sensing engines may be arranged to provide increasing radial precision measurements of the surface as more observations are collected.

Also, in some embodiments, because the trajectories for surface representation may be built up progressively on sub-millisecond scales, sensing systems may be enabled to track motions by observing how the apparent distance of the surface in a very recently scanned region has changed over time periods that may be short enough to be considered continuous time updates. Accordingly, in some embodiments, sensing engines may be arranged to provide a full 6D representation of reality comprised of 2D surfaces with orientations moving through 3D space over time. This native 6D representation may be advantageous because it may provide for a more expressive and accurate basis for various application specific perception algorithms to operate on.

Also, in some embodiments, machine learning based recognition algorithms may use shape and motion primitives (e.g., trajectories) as their input instead of 2D color contrast or 3D point arrays. Representing scanning environment using trajectories distinctly and accurately identify shapes and features as they exist in the scanned environment. In contrast, some conventional machine vision systems may rely on guesses or statistical approximations about whether there may an object in a location or a phantom due to novel contrasts, or whether points in space are part of the same surface or how the surface is moving.

Further, in some embodiments, sensing engines may require fewer data values to represent surface or object features using parameterized trajectories than conventional representation using 2D pixel or 3D point clouds. Also, in some embodiments, representing surfaces/objects using trajectories may be advantageous because they may be natively invariant under many transforms such as rotations, translations and lighting changes.

Accordingly, in some embodiments, the amount of data collected to train deep learning recognition algorithms may be orders of magnitude less than the less expressive representations such as 2D images or 3D point clouds. As an example, 2D color techniques employed to recognize a pedestrian may require the collection of data with pedestrians in all possible poses and positions with respect to the system, along with all possible lighting conditions and ambient background textures. In contrast, in some embodiments, sensing engines may be arranged to identify the surface shape of pedestrians in a variety of poses to not just localize and recognize them, but also describe very important properties such as their orientation and relative motion of body parts, all done within several milliseconds of first seeing the pedestrian.

Also, in some embodiments, sensing systems as described herein may be applied to other application domains beyond autonomous mobility. For example, in some embodiments, sensing engines and modeling engines may be employed by a robot picking fruit in a field to search through dense foliage for a ripe fruit, identifying the surface characteristics in fine detail, while at the same time calculating the optimal grasp location in sub-millisecond updates while the robot hand quickly reaches in to grab the berry, far faster than human pickers or conventional picking machines.

Figure 11:
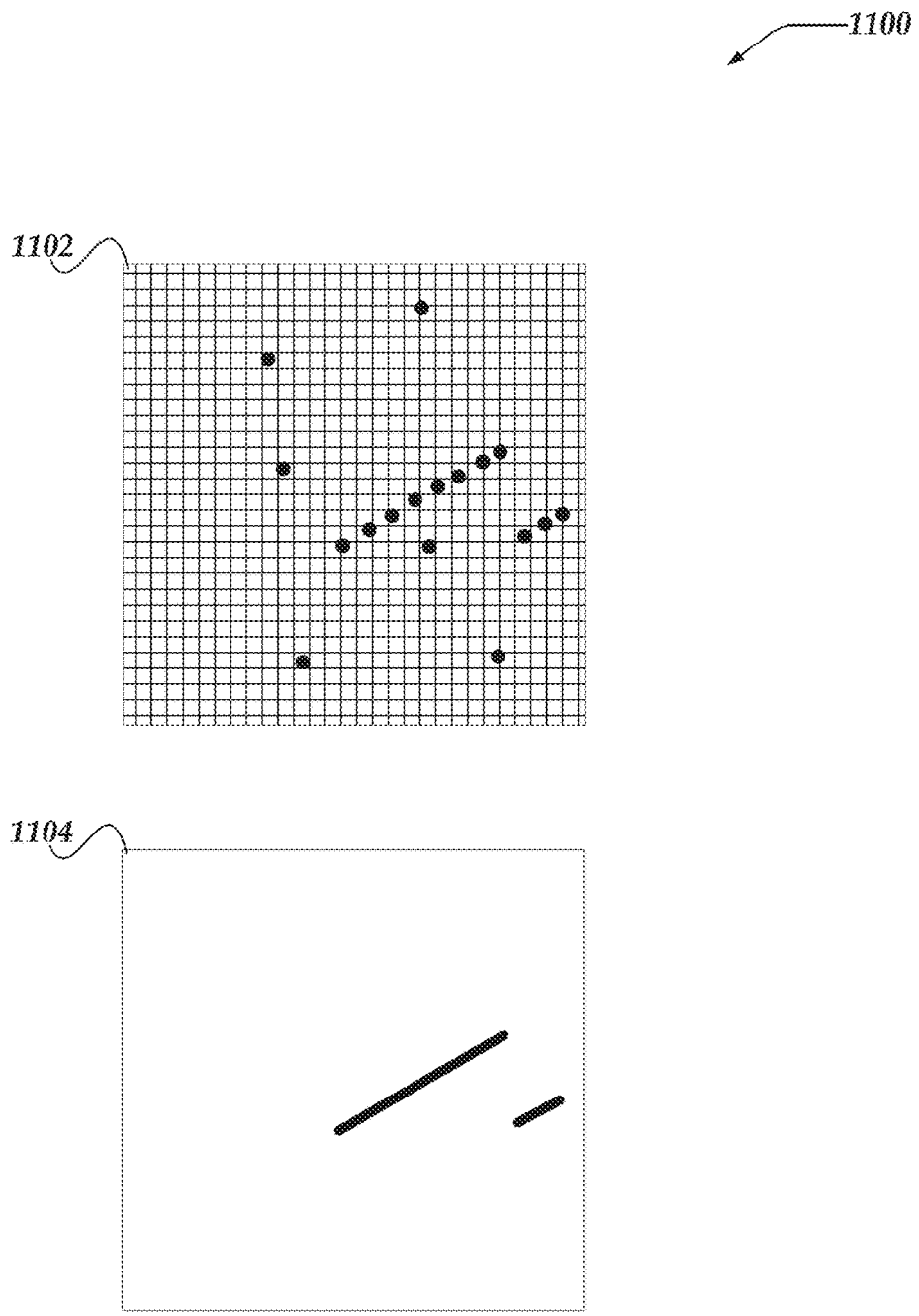
FIG. 11 illustrates a logical schematic of a system for perceiving objects based on sensing surfaces and sensing surface motion in accordance with one or more of the various embodiments.

FIG. 11 illustrates a logical schematic of system 1100 for perceiving objects based on sensing surfaces and sensing surface motion in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 1102 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

Generalized Operations

FIGS. 12-17 represent generalized operations for perceiving objects based on sensing surfaces and sensing surface motion in accordance with one or more of the various embodiments. In one or more of the various embodiments, processes 1200, 1300, 1400, 1500, 1600, and 1700 described in conjunction with FIGS. 12-17 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-16 may perform actions for perceiving objects based on sensing surfaces and sensing surface motion in accordance with at least one of the various embodiments or architectures such as those described in conjunction with FIGS. 4-11. Further, in one or more of the various embodiments, some or all of the actions performed by processes 1200, 1300, 1400, 1500, 1600, and 1700 may be executed in part by sensing engine 322, or modeling engine 324 running on one or more processors of one or more network computers.

Figure 12:
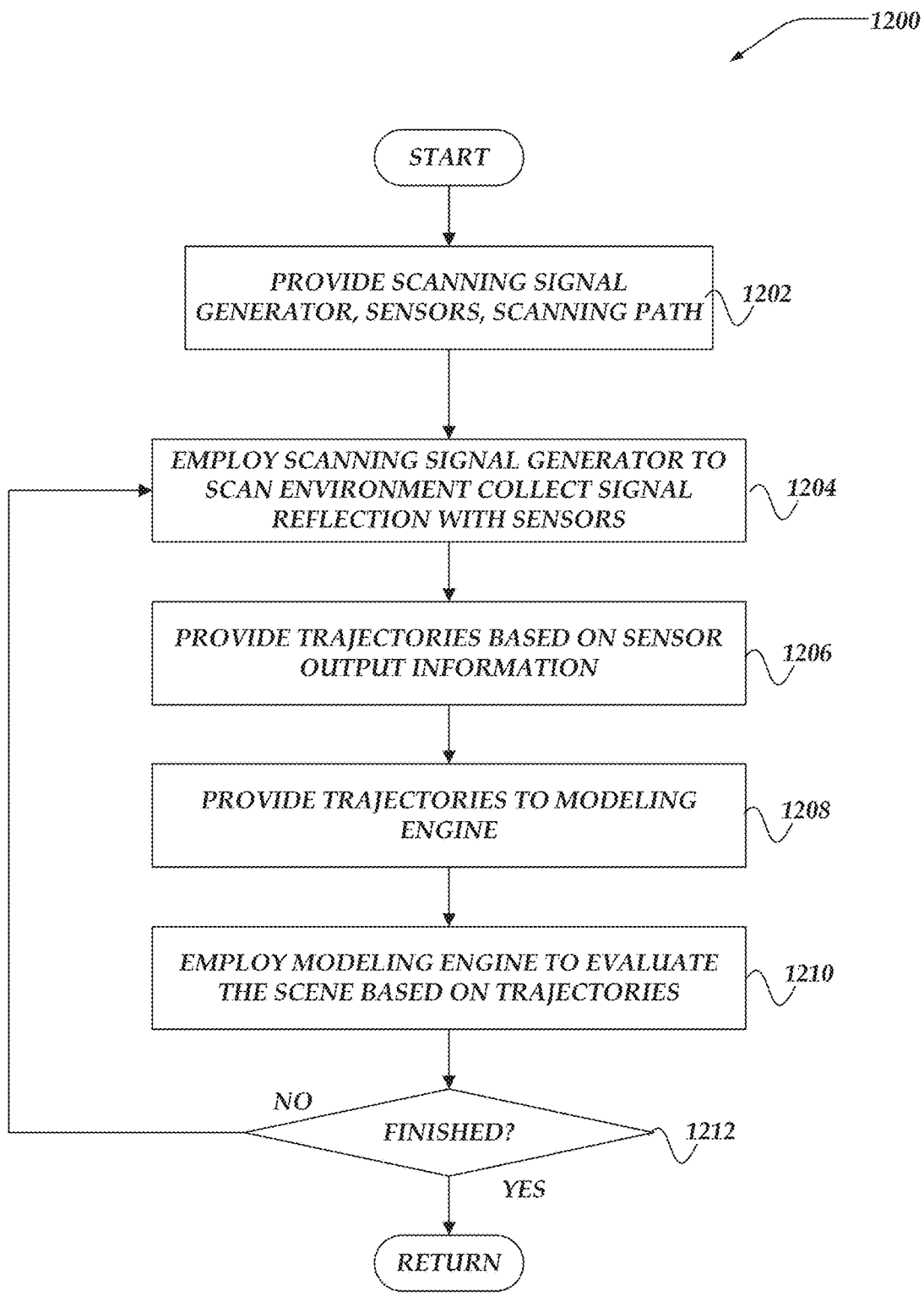
FIG. 12 illustrates an overview flowchart of a process for perceiving objects based on sensing surfaces and sensing surface motion in accordance with one or more of the various embodiments.

FIG. 12 illustrates an overview flowchart of process 1200 for perceiving objects based on sensing surfaces and sensing surface motion in accordance with one or more of the various embodiments. After a start flowchart block, at flowchart block 1202, in one or more of the various embodiments, one or more scanning signal generators, one or more sensors, or the like. Also, in some embodiments, a specific scanning path may be provided to direct the beam or signal from the scanning signal generator to traverse a specified curve or path through a scanning environment. At block 1204, in one or more of the various embodiments, sensing engines may be arranged to employ the scanning signal generator to scan a signal beam through the environment of interest to collect signal reflections of the signal at the sensors. At block 1206, in one or more of the various embodiments, sensing engines may be arranged to provide scene trajectories based on the sensor output information. At block 1208, in one or more of the various embodiments, sensing engines may be arranged to provide one or more scene trajectories to a modeling engine. At block 1210, in one or more of the various embodiments, modeling engines may be arranged to evaluate the scene in the scanned environment based on the trajectories. As described herein, modeling engines may be arranged to employ various evaluation models that may be tuned or trained to identify one or more shapes, objects, object activity, or the like, based on trajectories. At decision block 1212, in one or more of the various embodiments, if the scanning may be finished, control may be returned to a calling process; otherwise, control may loop back to block 1204.

Figure 13:
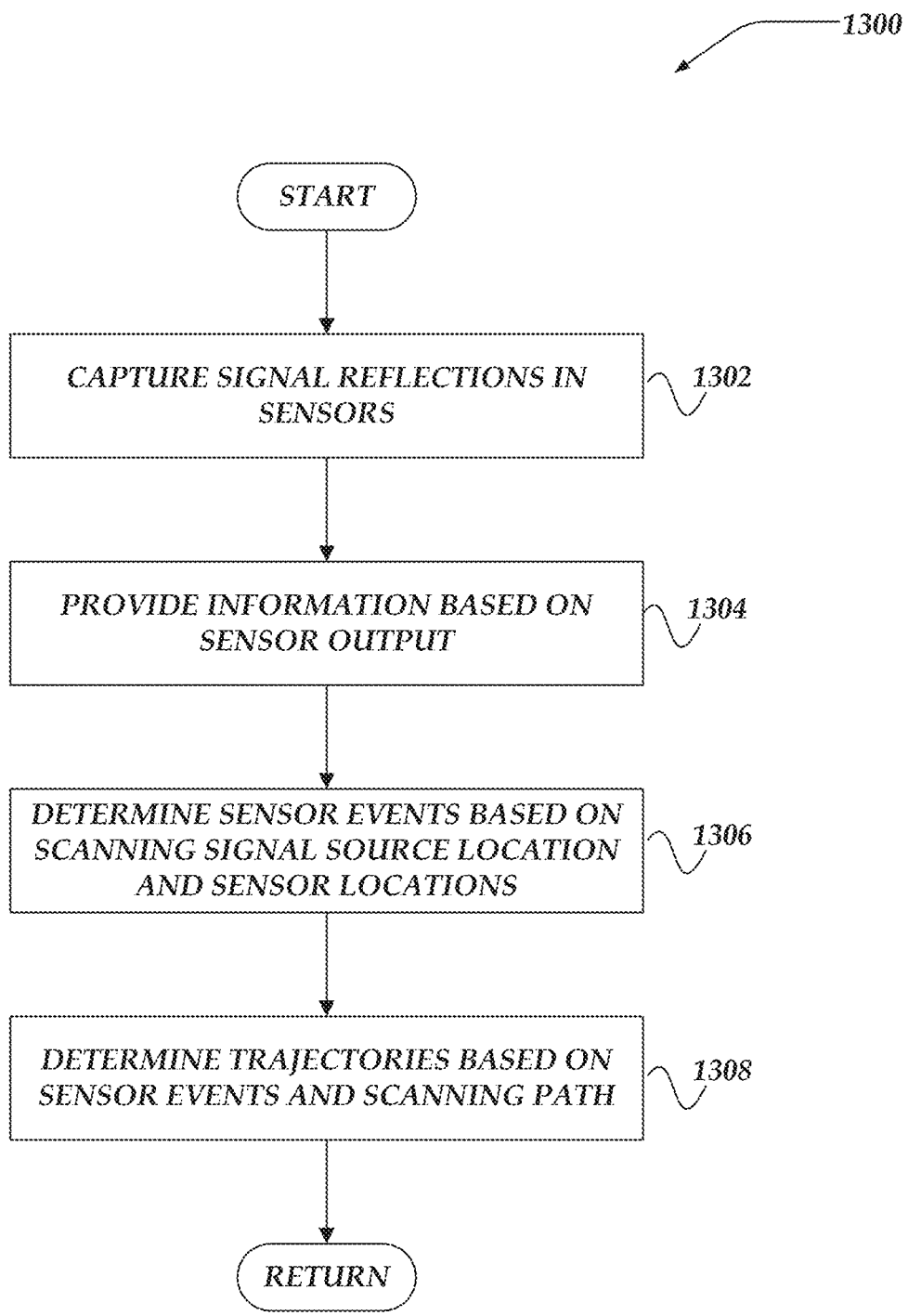
FIG. 13 illustrates a flowchart of a process for perceiving objects based on sensing surfaces and sensing surface motion in accordance with one or more of the various embodiments.

FIG. 13 illustrates a flowchart of process 1300 for perceiving objects based on sensing surfaces and sensing surface motion in accordance with one or more of the various embodiments. After a start block 1302, in one or more of the various embodiments, one or more sensors may capture signal reflections in the one or more sensors. At block 1304, in one or more of the various embodiments, location and time information based on sensor output may be provided to sensing engine. At block 1306, in one or more of the various embodiments, sensing engines may be arranged to determine one or more sensor events based on the scanning signal source location and sensor location. At block 1308, in one or more of the various embodiments, sensing engines may be arranged to determine one or more scene trajectories based on the one or more sensor events and the scanning path of the signal beam. Next, in one or more of the various embodiments, control may be returned to a calling process.

Figure 14:
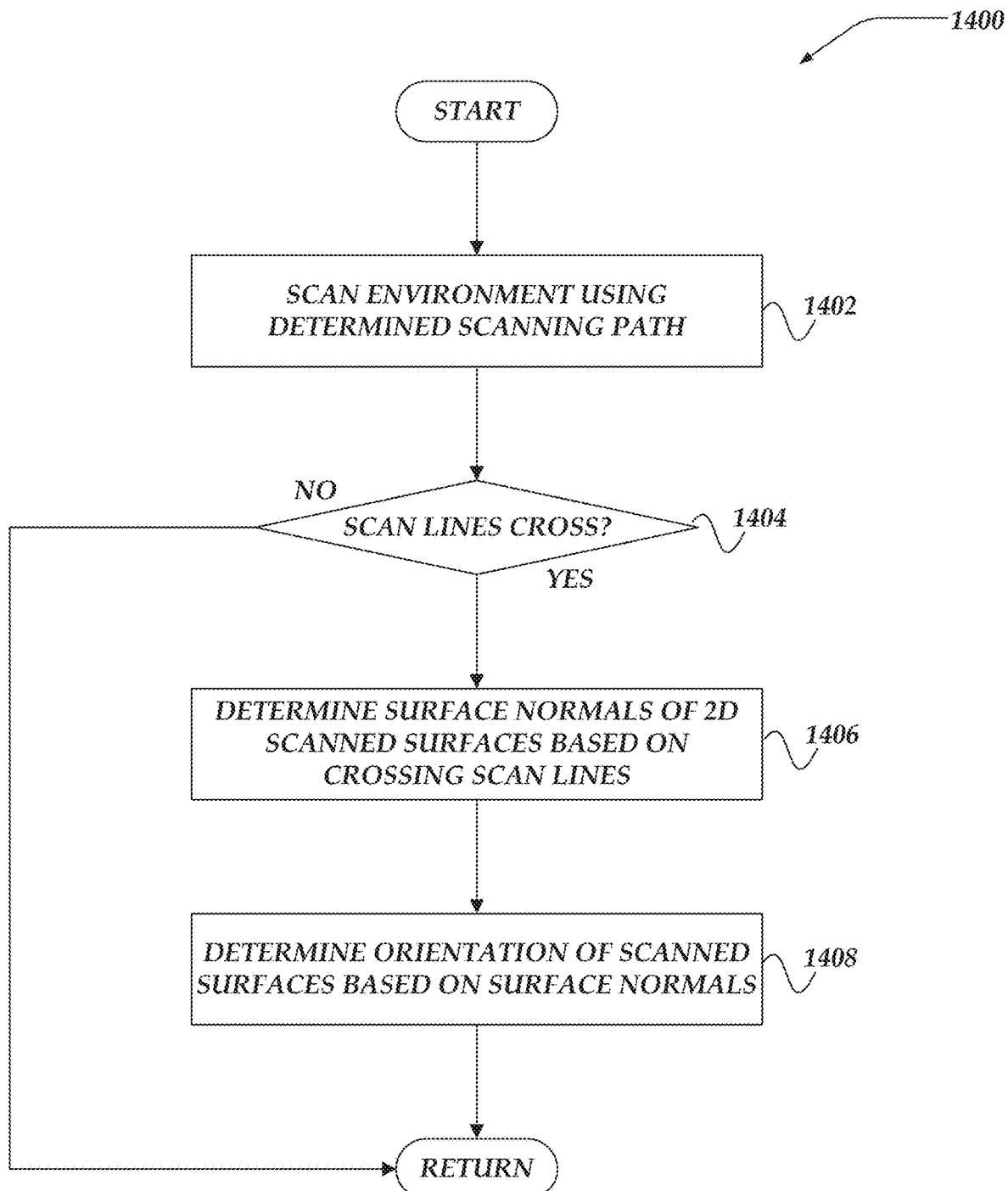
FIG. 14 illustrates a flowchart of a process for perceiving objects based on sensing surfaces and sensing surface motion in accordance with one or more of the various embodiments.

FIG. 14 illustrates a flowchart of process 1402 for perceiving objects based on sensing surfaces and sensing surface motion in accordance with one or more of the various embodiments. After a start block 1402, in one or more of the various embodiments, sensing engines may be arranged to scan the scanning environment using a beam from the scanning signal generator. At decision block 1404, in one or more of the various embodiments, if the scan line crosses another previously collected scene trajectory, control may flow to block 1406; otherwise, control may be returned to a calling process. At block 1406, in one or more of the various embodiments, sensing engines may be arranged to determine surface normals of the 2-dimensional scanned surfaces based on crossing scan lines. At block 1408, in one or more of the various embodiments, sensing engines may be arranged to determine the orientation of the scanned surfaces based on the compute surface normals. Next, in one or more of the various embodiments, control may be returned to a calling process.

Figure 15:
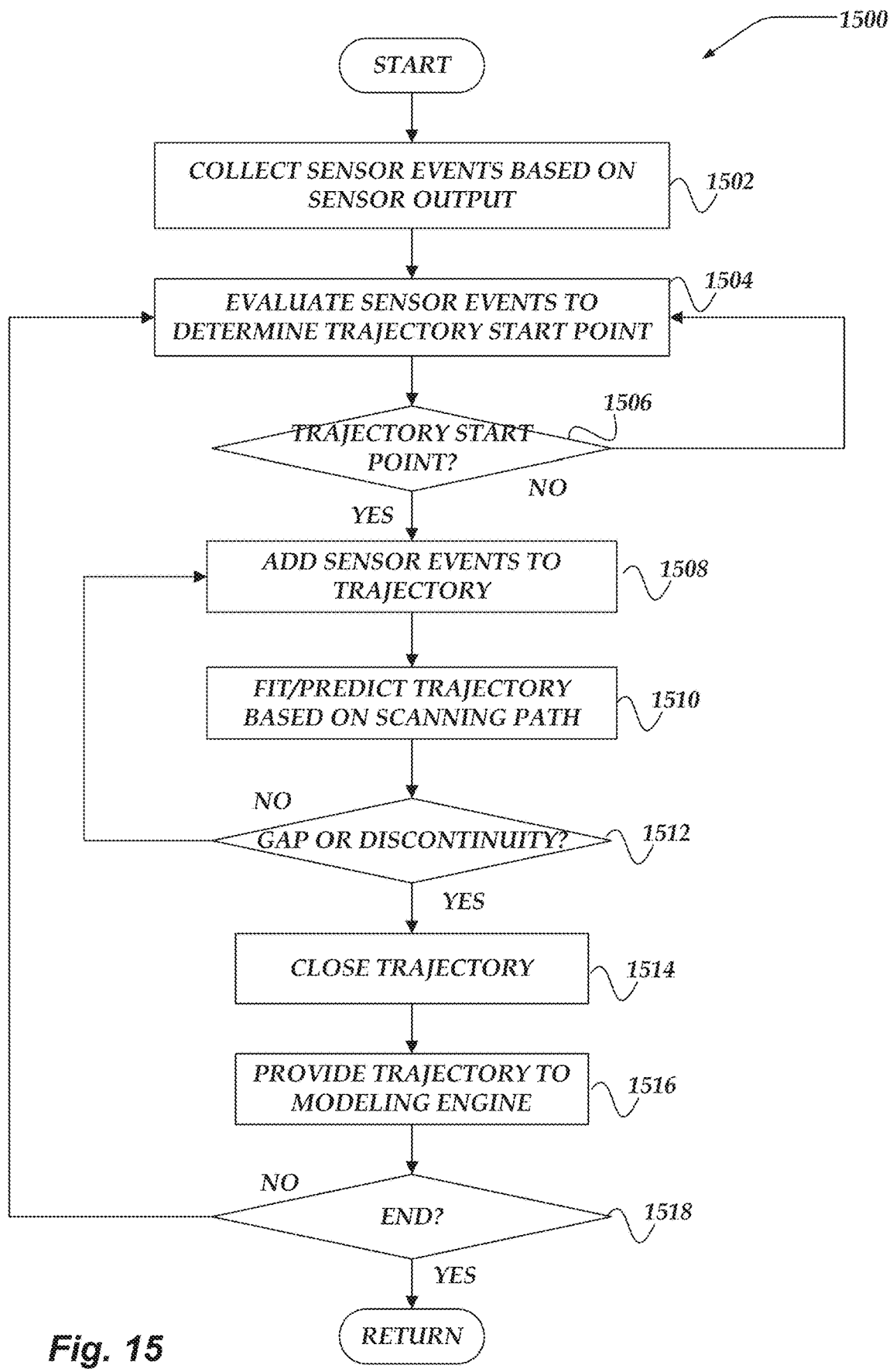
FIG. 15 illustrates a flowchart of a process for perceiving objects based on sensing surfaces and sensing surface motion in accordance with one or more of the various embodiments.

FIG. 15 illustrates a flowchart of process 1502 for perceiving objects based on sensing surfaces and sensing surface motion in accordance with one or more of the various embodiments. After a start block 1502, in one or more of the various embodiments, sensing engines may be arranged to collect sensor events based on the output of one or more sensors. As described above, sensor events may be provided based on multiple reports from more than one sensor (e.g., triangulation, or the like). Also, in some embodiments, sensor events may be provided for each sensor individually. At block 1504, in one or more of the various embodiments, sensing engines may be arranged to evaluate the one or more sensor events to determine a trajectory starting point. At decision block 1506, in one or more of the various embodiments, if a trajectory start point may be determined, control may flow to block 1508; otherwise, control may loop back to block 1504. At block 1508, in one or more of the various embodiments, sensing engines may be arranged to add sensor events to a trajectory. In some embodiments, as sensor events may be collected, they may be associated with the open trajectory. In some embodiments, the additional sensor events may be employed to refine or update the trajectory and more information is collected. At block 1510, in one or more of the various embodiments, sensing engines may be arranged to fit/predict the one or more sensor events to the trajectory based on the scanning path. At decision block 1512, in one or more of the various embodiments, if a gap or discontinuity may be determined, control may flow to block 1514; otherwise, control may loop back 1508. At block 1514, in one or more of the various embodiments, sensing engines may be arranged to close the current trajectory. At block 1516, in one or more of the various embodiments, sensing engines may be arranged to provide the closed trajectory to a modeling engine. At decision block 1518, in one or more of the various embodiments, if the scanning process may be finished, control may be retuned a calling process; otherwise, control may loop back to block 1504. Next, in one or more of the various embodiments, control may be returned to a calling process.

Figure 16:
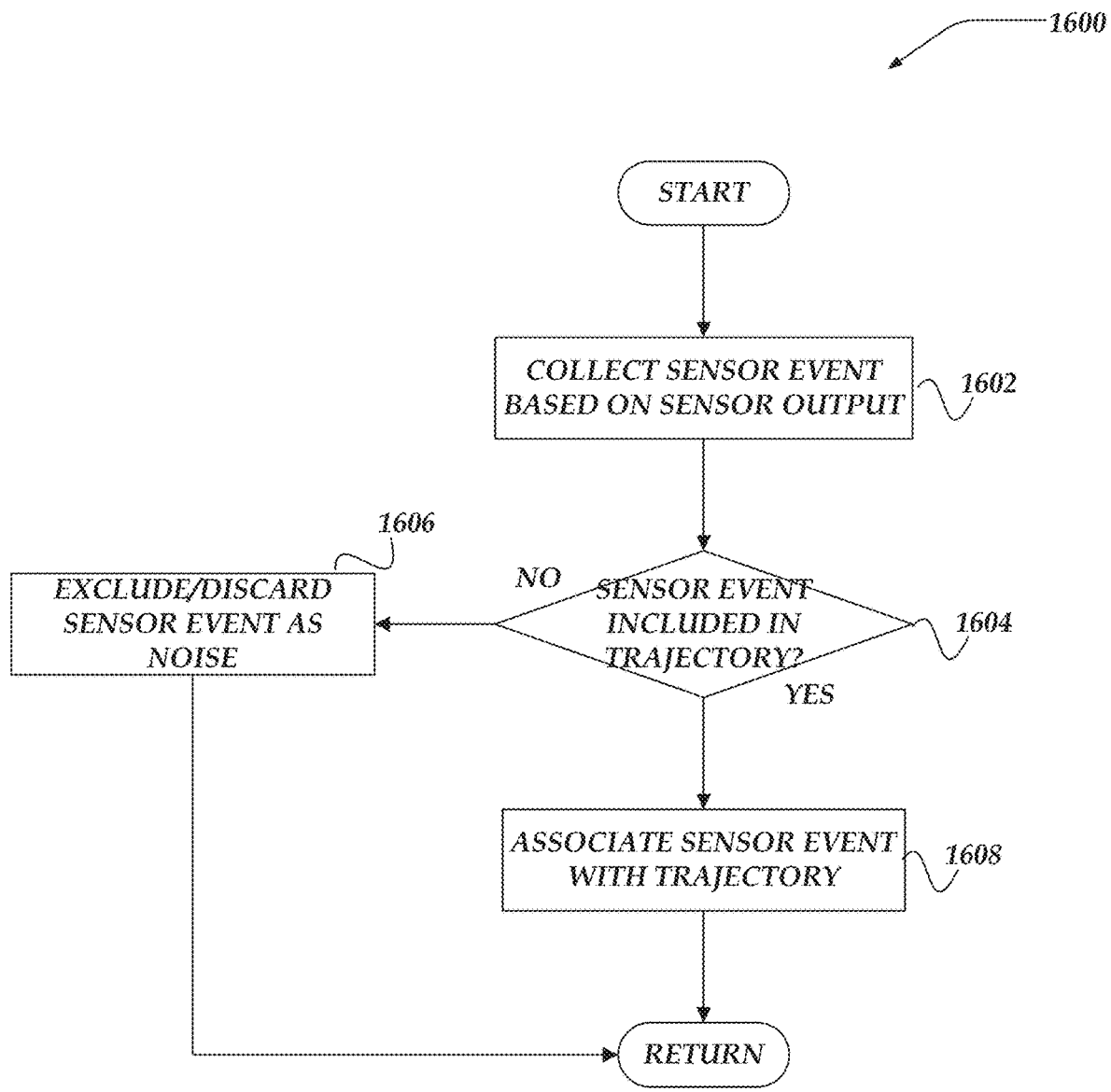
FIG. 16 illustrates a flowchart of a process for perceiving objects based on sensing surfaces and sensing surface motion in accordance with one or more of the various embodiments.
Figure 17:
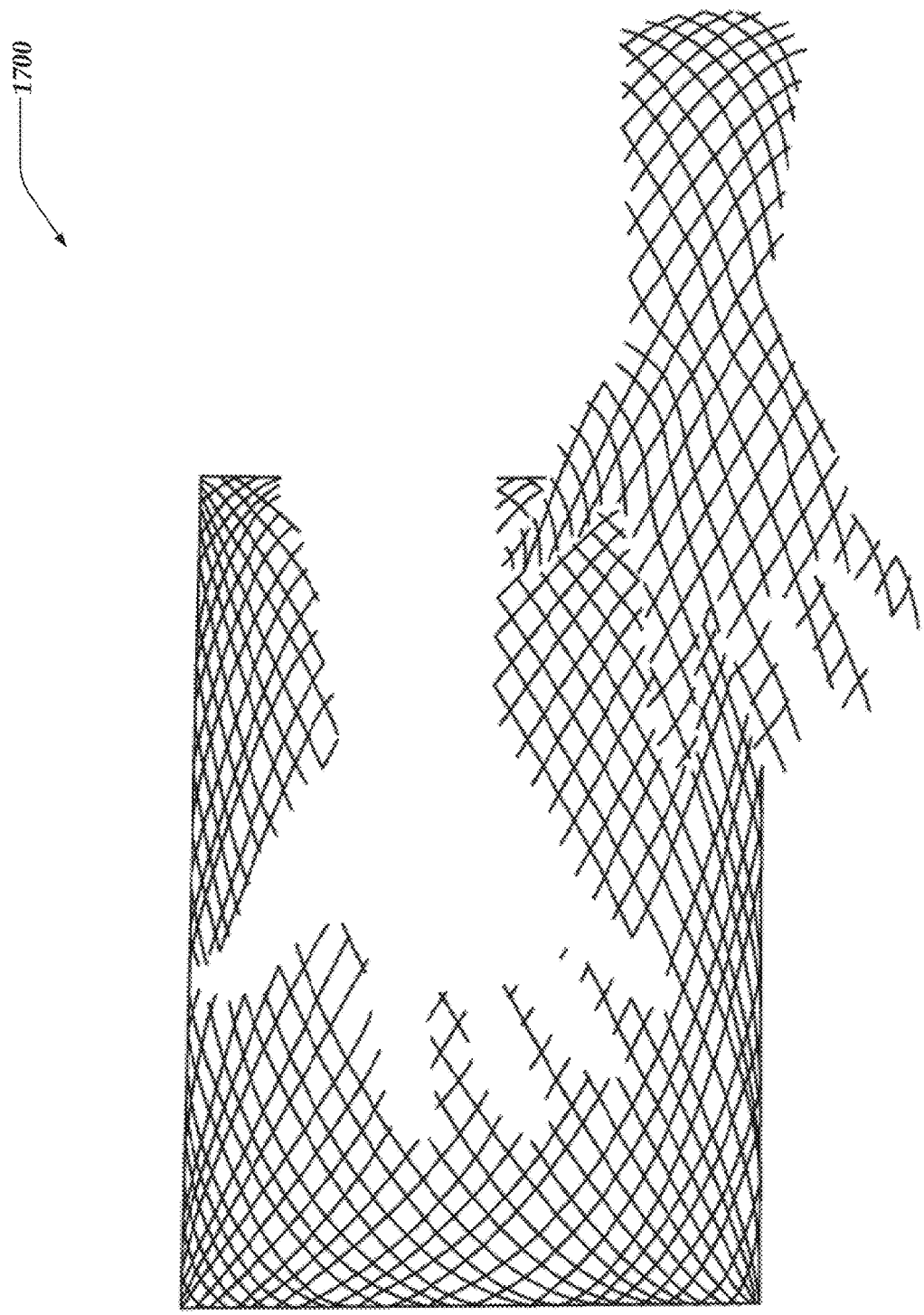
FIG. 17 illustrates a non-limiting use case for perceiving objects based on sensing surfaces and sensing surface motion in accordance with one or more of the various embodiments.

FIG. 16 illustrates a flowchart of process 1602 for perceiving objects based on sensing surfaces and sensing surface motion in accordance with one or more of the various embodiments. After a start block 1602, in one or more of the various embodiments, sensing engines may be arranged to a collect a sensor event based on the output of one or more sensors. At decision block 1604, in one or more of the various embodiments, if the sensor event may be included in a trajectory, control may flow to block 1608; otherwise, control may flow block 1606. At block 1606, in one or more of the various embodiments, sensing engines may be arranged to exclude or discard the sensor event as noise. Next, in one or more of the various embodiments, control may be returned to a calling process. At block 1608, in one or more of the various embodiments, sensing engines may be arranged to associate the sensor event with trajectory. Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Use Case

In one or more of the various embodiments, sensing systems may be employed to perceive arbitrarily complex environments depending on the application of the sensing system. For brevity and clarity, the bulk of the description above employs simple surfaces, objects, or scenes to disclose innovations that enable perceiving objects based on sensing surfaces and sensing surface motion. However, one of ordinary skill in the art will appreciate that some or all of these innovations may be employed to perceive complex environments that include few or many complex objects or surfaces that may be in motion, experiencing deformation, surface changes, or shape changes that may be perceived as they occur in real-time. As described for the example shown in FIG. 9 (the rotating cube object), sensing engines may dynamically generate new trajectories or update existing trajectories based on how objects or surfaces in the scanning environment move or change. As described above, these updated/additional trajectories may be provided to modeling engines in the form numerical representations, such as, vectors, arrays, matrices, or the like, where each element corresponds to a parameter value that is part of a parametric representation of a segment of an analytical curve. Accordingly, modeling engines may be arranged to employ one or more evaluation models to identify one or more features associated with the sensed surfaces based on the trajectories provided to the evaluation models. The particular features of interest or actions taken in response to determining particular features may vary depending on the application.

In this example, environment 1700 represents a scene that includes a human hand. In this example, the contour lines may correspond to trajectories determined from the scene. Accordingly, consistent with this example, in some embodiments, modeling engines may be arranged to employ evaluation models that have been tuned or trained to determine various features of complex objects, such as, the human hand based on trajectories. In this example, such features may include, shape, size, finger position, hand position, rotations, rates of motion, distance from other surfaces or other objects, or the like.

What is claimed as new and desired to be protected by Letters Patent of the United States is:

1. A method for perceiving one or more surfaces of one or more objects using one or more processors that are configured to execute instructions, wherein the instructions perform actions, comprising:
    obtaining, by one or more sensing servers, one or more trajectories of one or more reflections of a signal projected, by one or more signal generators, in one or more scanning paths towards the one or more surfaces based on a collection of a continuous stream of sensor events detected by one or more sensors, wherein each trajectory is a parametric representation of a one-dimensional curve segment having one or more constant coefficients that correspond to a location of a signal generator for the signal and one or more detected sensor events on the one or more scanning paths in a three-dimensional space, and wherein a start of each trajectory begins with an end of another trajectory caused by one or more of a maximum length, maximum amount of time, or discontinuity in the stream of detected sensor events;
    employing the one or more trajectories to collect one or more sensor events on the one or more scanning paths for the one or more surfaces;
    transmitting the one or more trajectories to a modeling engine to perform one or more further actions based on the one or more trajectories and the one or more sensor events on the scanning paths for the one or more surfaces, including:
    in response to obtaining one or more changes to the one or more sensors events on the one or more scanning paths for the one or more surfaces, updating the one or more trajectories based on the one or more changed sensor events; and
    performing one or more additional actions based on the one or more updated trajectories and the one or more changed sensor events on the one or more scanning paths for the one or more surfaces.

2. The method of claim 1, wherein the one or more changes to the one or more sensor events on the one or more scanning paths for the one or more surfaces comprises one or more of a position change, an orientation change, a motion change, or a deformation of the one or more surfaces.

3. The method of claim 1, further comprising:
    providing the continuous stream of sensor events wherein each sensor event includes one or more of a timestamp, time of flight, or location values.

4. The method of claim 1, further comprising:
    collecting one or more shapes that correspond to the one or more surfaces based on one or more characteristics of the one or more sensor events on the one or more scanning paths for the one or more surfaces and the one or more trajectories.

5. The method of claim 1, wherein each trajectory further comprises a parametric representation of a B-spline.

6. The method of claim 1, further comprising, employing the one or more trajectories to continuously collect one or more changes to one or more of a position of the one or more surfaces, an orientation of the one or more surfaces, a deformation of the one or more surfaces, or a motion of the one or more surfaces.

7. The method of claim 1, wherein performing the further actions, further comprises:
    collecting the one or more objects based on a portion of the one or more trajectories that are associated with a portion of the one or more surfaces.

8. The method of claim 6, wherein performing the further actions, further comprises,
    collecting one or more features of the one or more objects based on the one or more trajectories, wherein the one or more features include one or more of a position, an orientation, a motion or a deformation of the one or more objects.

9. A system for perceiving one or more surfaces for one or more objects:
    a network computer, comprising:
        a memory that stores at least instructions; and
        one or more processors configured to execute instructions, wherein the instructions perform actions, including:
            obtaining, by one or more sensing servers, one or more trajectories of one or more reflections of a signal projected, by one or more signal generators, in one or more scanning paths towards the one or more surfaces based on a collection of a continuous stream of sensor events detected by one or more sensors, wherein each trajectory is a parametric representation of a one-dimensional curve segment having one or more constant coefficients that correspond to a location of a signal generator for the signal and one or more detected sensor events on the one or more scanning paths in a three-dimensional space, and wherein a start of each trajectory begins with an end of another trajectory caused by one or more of a maximum length, maximum amount of time, or discontinuity in the stream of detected sensor events;
            employing the one or more trajectories to collect one or more sensor events on the one or more scanning paths for the one or more surfaces;
            transmitting the one or more trajectories to a modeling engine, to perform one or more further actions based on the one or more trajectories and the one or more sensor events on the scanning paths for the one or more surfaces, including:
                in response to obtaining one or more changes to the one or more sensors events on the one or more scanning paths for the one or more surfaces, updating the one or more trajectories based on the one or more changed sensor events; and
                performing one or more additional actions based on the one or more updated trajectories and the one or more changed sensor events on the one or more scanning paths for the one or more surfaces; and
    one or more client computers, comprising:

a memory that stores at least instructions; and
one or more processors configured to execute instructions, wherein the instructions perform actions, including, providing one or more portions of the sensor events.

10. The system of claim 9, wherein the one or more changes to the one or more sensor events on the one or more scanning paths for the one or more surfaces comprises one or more of a position change, an orientation change, a motion change, or a deformation of the one or more surfaces.

11. The system of claim 9, wherein the one or more processors of the network computer are configured to execute instructions, wherein the instructions perform actions further comprising:
providing the continuous stream of sensor events, wherein each sensor event includes one or more of a timestamp, time of flight, or location values.

12. The system of claim 9, wherein the one or more processors of the network computer are configured to execute instructions, wherein the instructions perform actions further comprising:
collecting one or more shapes that correspond to the one or more surfaces based on one or more characteristics of the one or more sensor events on the one or more scanning paths for the one or more surfaces and the one or more trajectories.

13. The system of claim 9, wherein each trajectory further comprises a parametric representation of a B-spline.

14. The system of claim 9, wherein the one or more processors of the network computer are configured to execute instructions, wherein the instructions perform actions further comprising:
employing the one or more trajectories to continuously collect one or more changes to one or more of a position of the one or more surfaces, an orientation of the one or more surfaces, a deformation of the one or more surfaces, or a motion of the one or more surfaces.

15. The system of claim 9, wherein performing the further actions, further comprises:
collecting the one or more objects based on a portion of the one or more trajectories that are associated with a portion of the one or more surfaces.

16. The system of claim 15, wherein performing the further actions, further comprises,
collecting one or more features of the one or more objects based on the one or more trajectories, wherein the one or more features include one or more of a position, an orientation, a motion or a deformation of the one or more objects.

17. A processor readable non-transitory storage media that includes instructions for perceiving one or more surfaces for one or more objects, wherein execution of the instructions by one or more processors on one or more network computers performs actions, comprising:
obtaining, by one or more sensing servers, one or more trajectories of one or more reflections of a signal projected, by one or more signal generators, in one or more scanning paths towards the one or more surfaces based on a collection of a continuous stream of sensor events detected by one or more sensors, wherein each trajectory is a parametric representation of a one-dimensional curve segment having one or more constant coefficients that correspond to a location of a signal generator for the signal and one or more detected sensor events on the one or more scanning paths in a three-dimensional space, and wherein a start of each trajectory begins with an end of another trajectory caused by one or more of a maximum length, maximum amount of time, or discontinuity in the stream of detected sensor events;
employing the one or more trajectories to collect one or more sensor events on the one or more scanning paths for the one or more surfaces;
transmitting the one or more trajectories to a modeling engine to perform one or more further actions based on the one or more trajectories and the one or more sensor events on the scanning paths for the one or more surfaces, including:
in response to obtaining one or more changes to the one or more sensors events on the one or more scanning paths for the one or more surfaces, updating the one or more trajectories based on the one or more changed sensor events; and
performing one or more additional actions based on the one or more updated trajectories and the one or more changed sensor events on the one or more scanning paths for the one or more surfaces.

18. The media of claim 17, wherein the one or more changes to the one or more sensor events on the one or more scanning paths for the one or more surfaces comprises one or more of a position change, an orientation change, a motion change, or a deformation of the one or more surfaces.

19. The media of claim 17, further comprising:
providing the continuous stream of sensor events, wherein each sensor event includes one or more of a timestamp, time of flight, or location values.

20. The media of claim 17, further comprising:
collecting one or more shapes that correspond to the one or more surfaces based on one or more characteristics of the one or more sensor events on the one or more scanning paths for the one or more surfaces and the one or more trajectories.

21. The media of claim 17, wherein each trajectory further comprises a parametric representation of a B-spline.

22. The media of claim 17, further comprising, employing the one or more trajectories to continuously collect one or more changes to one or more of a position of the one or more surfaces, an orientation of the one or more surfaces, a deformation of the one or more surfaces, or a motion of the one or more surfaces.

23. The media of claim 17, wherein performing the further actions, further comprises:
collecting the one or more objects based on a portion of the one or more trajectories that are associated with a portion of the one or more surfaces.

24. The media of claim 23, wherein performing the further actions, further comprises,
collecting one or more features of the one or more objects based on the one or more trajectories, wherein the one or more features include one or more of a position, an orientation, a motion or a deformation of the one or more objects.

25. A network computer for perceiving one or more surfaces for one or more objects, comprising:
a memory that stores at least instructions; and
one or more processors configured to execute instructions, wherein the instructions perform actions, including:
obtaining, by one or more sensing servers, one or more trajectories of one or more reflections of a signal projected, by one or more signal generators, in one or more scanning paths towards the one or more surfaces based on a collection of a continuous stream of sensor events detected by one or more sensors, wherein each trajectory is a parametric representation of a one-dimensional curve segment having one or more constant coefficients that correspond to a location of a signal generator for the signal and one or more detected sensor events on the one or more scanning paths in a three-dimensional space, and wherein a start of each trajectory begins with an end of another trajectory caused by one or more of a maximum length, maximum amount of time, or discontinuity in the stream of detected sensor events;

employing the one or more trajectories to collect one or more sensor events on the one or more scanning paths for the one or more surfaces;

transmitting the one or more trajectories to a modeling engine, to perform one or more further actions based on the one or more trajectories and the one or more sensor events on the scanning paths for the one or more surfaces; and, including:

in response to obtaining one or more changes to the one or more sensors events on the one or more scanning paths for the one or more surfaces, updating the one or more trajectories based on the of one or more changed sensor events; and performing one or more additional actions based on the one or more updated trajectories and the one or more changed sensor events on the one or more scanning paths for the one or more surfaces.

26. The network computer of claim 25, wherein the one or more changes to the one or more sensor events on the one or more scanning paths for the one or more surfaces comprises one or more of a position change, an orientation change, a motion change, or a deformation of the one or more surfaces.

27. The network computer of claim 25, wherein the one or more processors are configured to execute instructions, wherein the instructions perform actions further comprising: providing the continuous stream of sensor events, wherein each sensor event includes one or more of a timestamp, time of flight, or location values.

28. The network computer of claim 25, wherein the one or more processors are configured to execute instructions, wherein the instructions perform actions further comprising:

collecting one or more shapes that correspond to the one or more surfaces based on one or more characteristics of the one or more sensor events on the scanning paths for the one or more surfaces and the one or more trajectories.

29. The network computer of claim 25, wherein each trajectory further comprises a parametric representation of a B-spline.

30. The network computer of claim 25, wherein the one or more processors are configured to execute instructions, wherein the instructions perform actions further comprising:

employing the one or more trajectories to continuously collect one or more changes to one or more of a position of the one or more surfaces, an orientation of the one or more surfaces, a deformation of the one or more surfaces, or a motion of the one or more surfaces.

31. The network computer of claim 25, wherein performing the further actions, further comprises:

collecting the one or more objects based on a portion of the one or more trajectories that are associated with a portion of the one or more surfaces.

32. The network computer of claim 31, wherein performing the further actions, further comprises, collecting one or more features of the one or more objects based on the one or more trajectories, wherein the one or more features include one or more of a position, an orientation, a motion or a deformation of the one or more objects.

* * * * *